(12) United States Patent
Lim et al.

(10) Patent No.: US 11,544,925 B1
(45) Date of Patent: Jan. 3, 2023

(54) KITCHEN SYSTEM WITH FOOD PREPARATION STATION

(71) Applicant: GOPIZZA Inc., Seoul (KR)

(72) Inventors: Jae Won Lim, Seoul (KR); Beom-Jin Lee, Seoul (KR)

(73) Assignee: GOPIZZA Inc., Seoul (KR)

( * ) Notice: Subject to any disclaimer, the term of this patent is extended or adjusted under 35 U.S.C. 154(b) by 0 days.

(21) Appl. No.: 17/464,430

(22) Filed: Sep. 1, 2021

(51) Int. Cl.
*A21D 13/41* (2017.01)
*G06V 20/40* (2022.01)
*G06Q 50/12* (2012.01)
*G06F 9/451* (2018.01)

(52) U.S. Cl.
CPC .............. *G06V 20/40* (2022.01); *A21D 13/41* (2017.01); *G06F 9/453* (2018.02); *G06Q 50/12* (2013.01); *G06V 20/44* (2022.01)

(58) Field of Classification Search
CPC ........... G06K 9/00711; G06K 9/00771; A21D 13/41
See application file for complete search history.

(56) References Cited

U.S. PATENT DOCUMENTS

| | | | |
|---|---|---|---|
| 7,454,390 B2 | 11/2008 | Nagamitsu et al. | |
| 7,478,749 B2 | 1/2009 | Clothier et al. | |
| 8,276,505 B2 | 10/2012 | Buehler | |
| 9,041,799 B2 | 5/2015 | Bielstein | |
| 9,131,807 B2 | 9/2015 | Roy et al. | |
| 10,136,742 B1* | 11/2018 | Leslie ..................... | A47F 10/06 |
| 10,210,444 B2 | 2/2019 | Kamei et al. | |
| 10,228,187 B2 | 3/2019 | Kim et al. | |
| 10,275,659 B2 | 4/2019 | Shi et al. | |
| 2004/0172380 A1 | 9/2004 | Zhang et al. | |
| 2005/0021407 A1* | 1/2005 | Kargman .................. | G07G 1/12 705/15 |
| 2008/0178749 A1* | 7/2008 | Stutman ............. | G06Q 30/0283 340/286.01 |
| 2010/0313768 A1 | 12/2010 | Koether et al. | |
| 2013/0101709 A1 | 4/2013 | Rader | |

(Continued)

FOREIGN PATENT DOCUMENTS

| | | |
|---|---|---|
| CN | 106123479 A | 11/2016 |
| CN | 109300346 A | 2/2019 |

(Continued)

OTHER PUBLICATIONS

Domino's Australia, screenshots of Youtube video "DOM Pizza Checker" as of Aug. 2021, published May 23, 2019, source: https://youtu.be/kp0Tc7hyNKw.

(Continued)

*Primary Examiner* — Brian T Pendleton
*Assistant Examiner* — Frank Johnson
(74) *Attorney, Agent, or Firm* — K&L Gates LLP

(57) ABSTRACT

This application discloses a technology for guiding a person to prepare foods at a food preparation station. The food preparation station has a plurality of food pans. The technology may track location changes of the food pans or ingredients contained in the food pans, and indicating the current location of an ingredient when needed. The technology monitors a dish being prepared, and provides a step-by-step guidance according a predetermined recipe.

12 Claims, 30 Drawing Sheets
(9 of 30 Drawing Sheet(s) Filed in Color)

(56) References Cited

U.S. PATENT DOCUMENTS

| | | | |
|---|---|---|---|
| 2016/0143474 A1* | 5/2016 | Wessels | G07F 13/065 |
| | | | 426/231 |
| 2017/0221296 A1 | 8/2017 | Jain et al. | |
| 2017/0258219 A1 | 9/2017 | Wilmes et al. | |
| 2017/0290345 A1* | 10/2017 | Garden | B25J 9/0093 |
| 2017/0365017 A1 | 12/2017 | Ells | |
| 2018/0157232 A1 | 6/2018 | Chen | |
| 2018/0275110 A1 | 9/2018 | Rafii et al. | |
| 2018/0284091 A1* | 10/2018 | Levanon | G01K 13/10 |
| 2018/0338504 A1* | 11/2018 | Lavri | A21C 3/02 |
| 2018/0345485 A1* | 12/2018 | Sinnet | G02B 27/017 |
| 2019/0187636 A1 | 6/2019 | Fong et al. | |
| 2020/0138206 A1 | 5/2020 | Seiss et al. | |
| 2020/0139554 A1 | 5/2020 | Sinnet et al. | |
| 2020/0149797 A1 | 5/2020 | Yamahira et al. | |
| 2020/0202086 A1 | 6/2020 | Duckett et al. | |
| 2020/0249660 A1* | 8/2020 | Rao | G05B 19/0428 |
| 2020/0269434 A1 | 8/2020 | Anderson et al. | |
| 2020/0394603 A1 | 12/2020 | Ottitsch et al. | |
| 2021/0022559 A1* | 1/2021 | Zito | A47J 44/00 |
| 2021/0279855 A1* | 9/2021 | Shangin | G06K 9/00711 |
| 2022/0015572 A1* | 1/2022 | Cottrell | G06K 9/6217 |

FOREIGN PATENT DOCUMENTS

| | | |
|---|---|---|
| CN | 109489765 A | 3/2019 |
| CN | 109805778 A | 5/2019 |
| CN | 209416439 U | 9/2019 |
| CN | 106774876 B | 7/2020 |
| CN | 106774877 B | 7/2020 |
| CN | 111459054 A | 7/2020 |
| CN | 112560713 A | 3/2021 |
| CN | 114419544 A | 4/2022 |
| JP | 2019-201396 A | 11/2019 |
| KR | 10-1899035 B1 | 10/2018 |
| KR | 10-1941477 B1 | 1/2019 |
| KR | 2019-0096851 A | 8/2019 |
| KR | 10-2019-0105531 A | 9/2019 |
| KR | 20200067317 A | 6/2020 |
| KR | 10-2021-0020702 A | 2/2021 |
| KR | 10-2021-0056173 A | 5/2021 |
| KR | 10-2021-0104360 A | 8/2021 |
| KR | 10-2021-0115484 A | 9/2021 |
| KR | 10-2329592 B1 | 11/2021 |
| KR | 10-2342816 B1 | 12/2021 |
| KR | 10-2022-0040225 A | 3/2022 |
| WO | 2017192765 A1 | 11/2017 |
| WO | 2020036553 A2 | 2/2020 |
| WO | 2020077501 A1 | 4/2020 |

OTHER PUBLICATIONS

Sato et al., MimiCook: A Cooking Assistant System with Situated Guidance, University of Tokyo, accessed Aug. 27, 2021, <https://lab.rekimoto.org/projects/mimicook/>.

Non-Final Office Action from U.S. Appl. No. 17/464,405, dated Dec. 7, 2021.

Final Office Action dated Mar. 28, 2022 in U.S. Appl. No. 17/464,405.

* cited by examiner

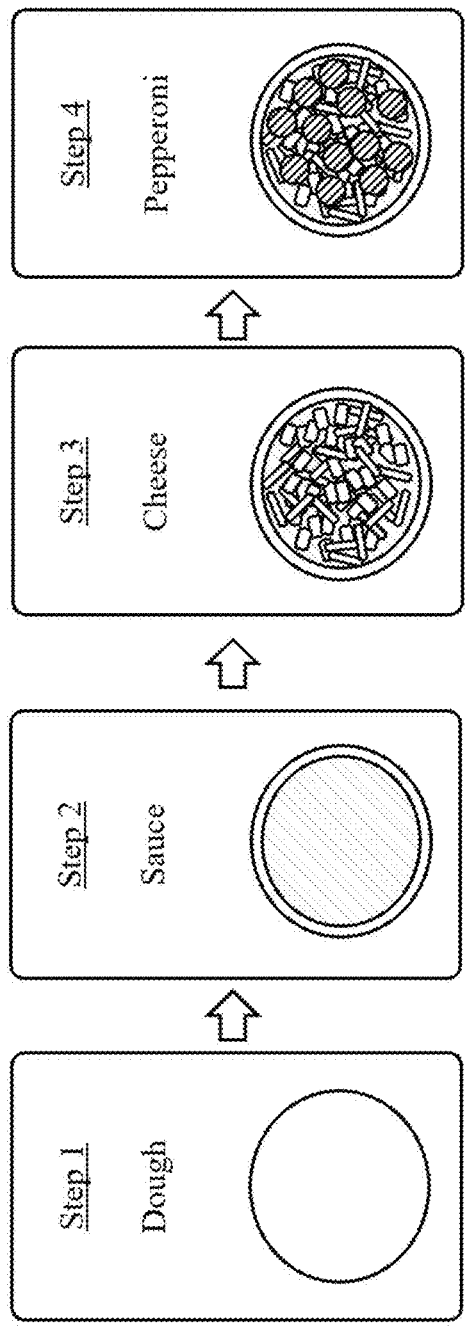

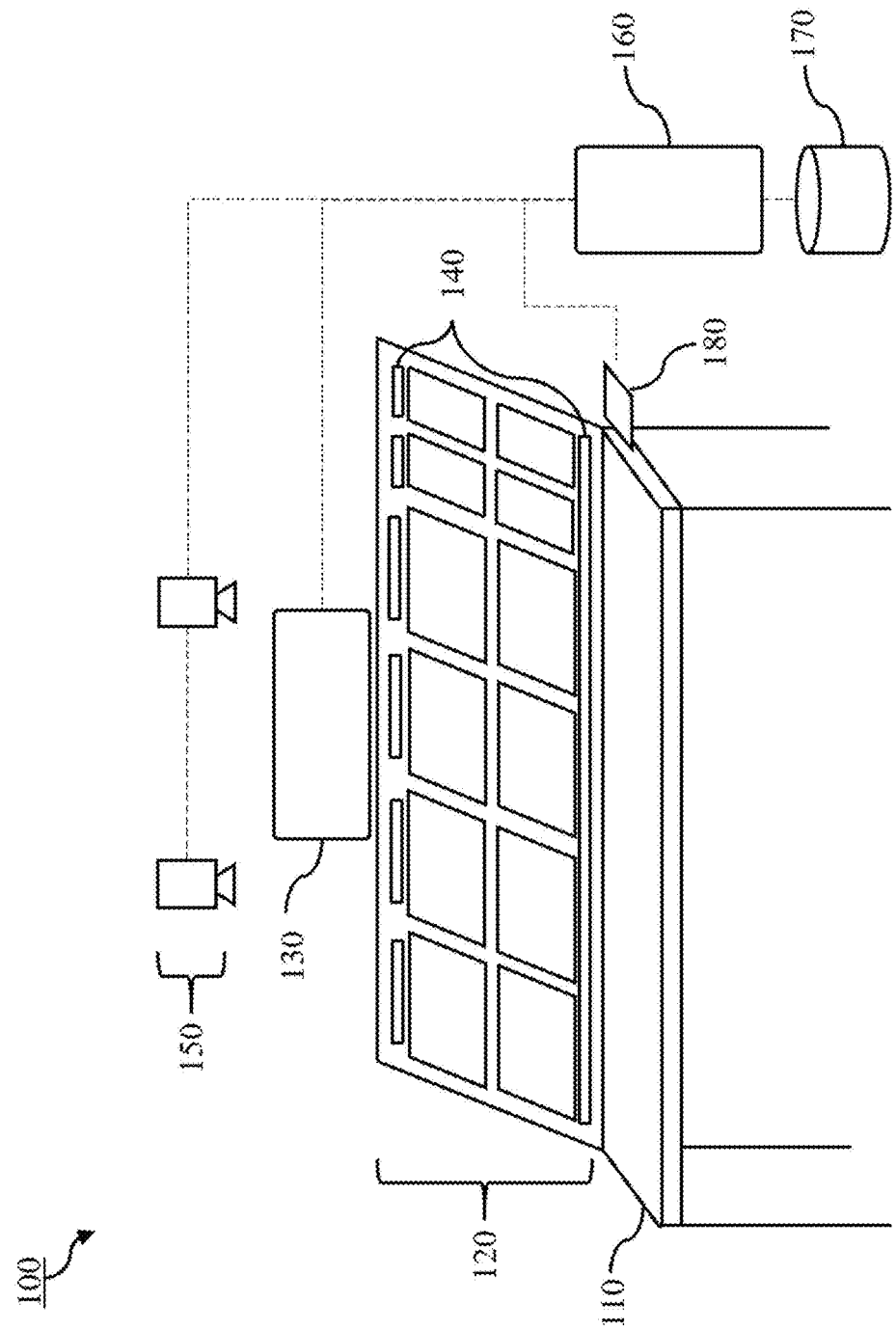

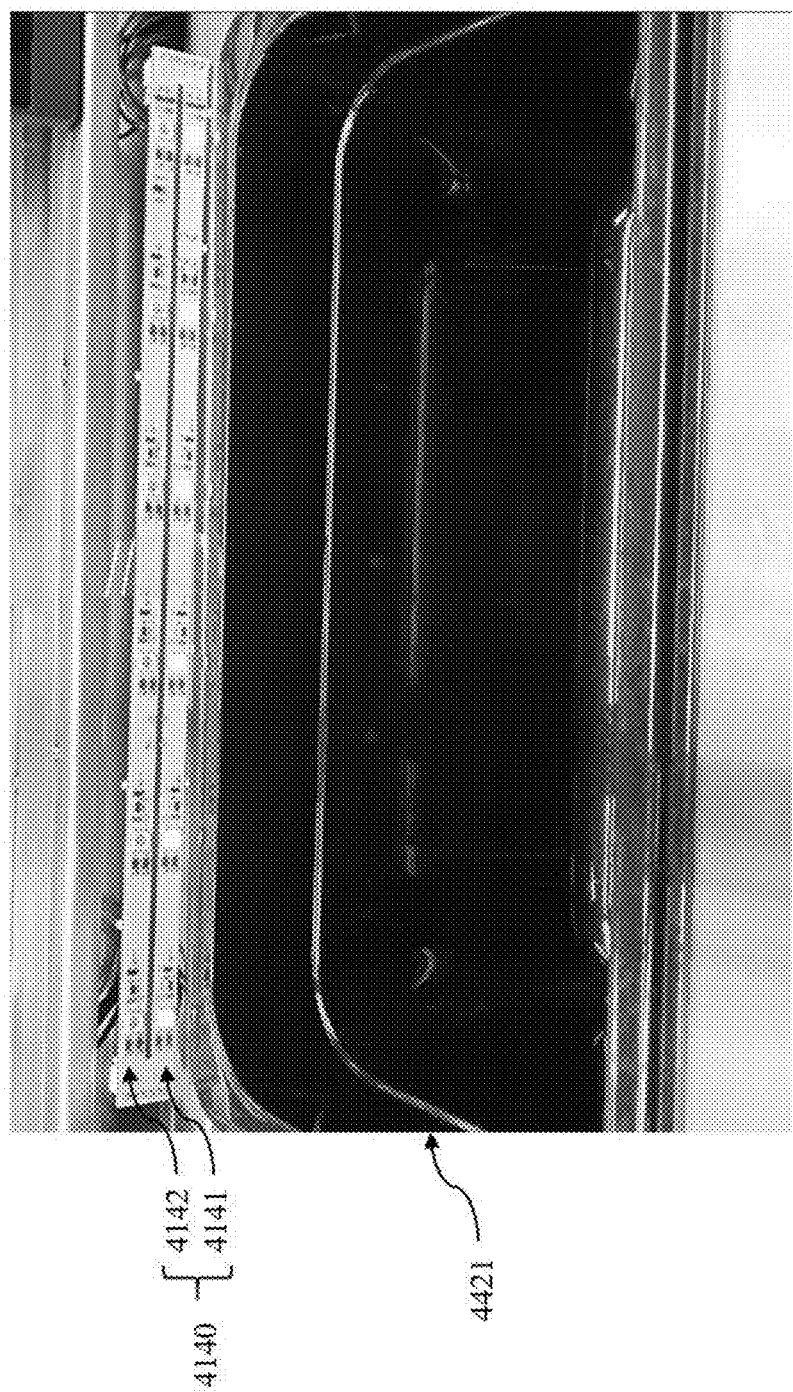

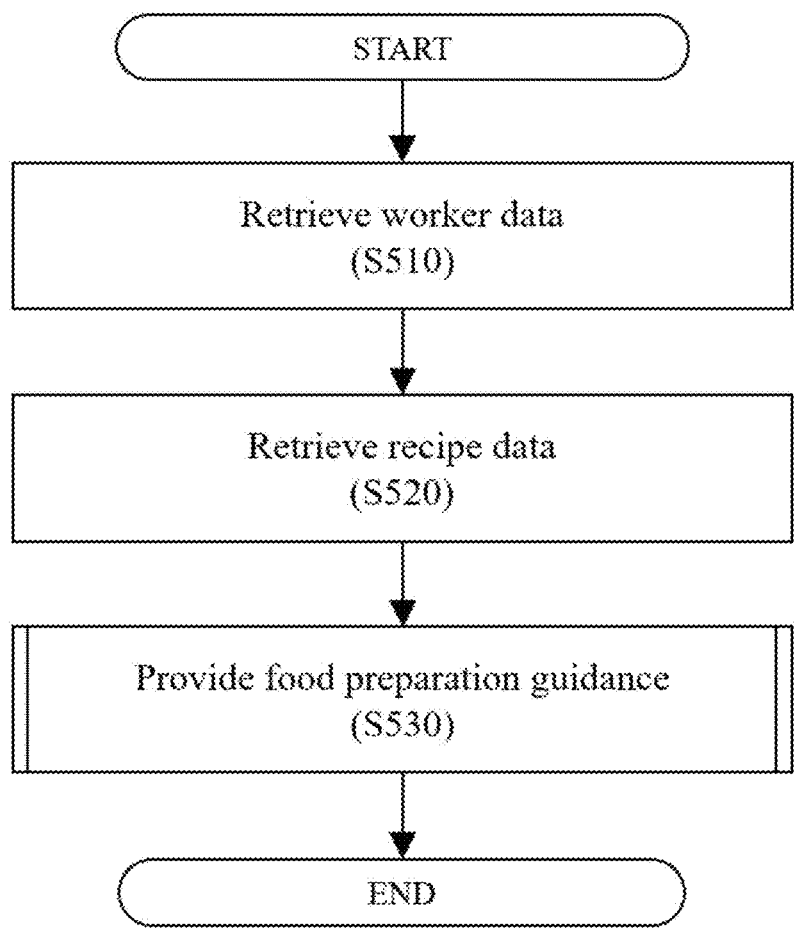

Figure 6B

| Order No. (681) | Recipe Name (610) | Worker ID (670) | Time of Order Received (682) | Time of Pizza Completed (683) | ... | Preparation Speed Rating (684) |
|---|---|---|---|---|---|---|
| GO14752 | Pepperoni Pizza | HKL | 2021-01-03 17:44:34 | 2021-01-03 17:47:11 | | B |
| GO14757 | Cheese Pizza | HKL | 2021-01-03 18:00:34 | 2021-01-03 18:04:21 | | A |
| GO14766 | Hawaiian Chicken Pizza | HKL | 2021-01-03 18:12:34 | 2021-01-03 18:41:42 | | A |
| GO14770 | Hawaiian Chicken Pizza | YJL | 2021-01-03 18:13:34 | 2021-01-03 18:16:34 | | A |
| GO14772 | Pepperoni Pizza | YJL | 2021-01-03 18:17:34 | 2021-01-03 18:18:355 | | A |

170

KITCHEN SYSTEM WITH FOOD PREPARATION STATION

BACKGROUND

Restaurants use food preparation stations in their kitchens. A typical food preparation station has food pans containing food ingredients. Restaurant workers prepare a dish using ingredients from the food pans. A change of ingredient location may confuse restaurant workers.

SUMMARY

One aspect of the present disclosure provides a method for use in food preparation. The method comprises: providing a food preparation station comprising a preparation table, indicating lights, at least one camera, at least one display, a pan array comprising a plurality of food pans which comprises a first food pan containing a first ingredient; providing at least one recipe database and at least one ingredient database; capturing at least one image of the pan array using the at least one camera; processing the at least one captured image to identify ingredients appearing on the at least one image and determine a location of each of the identified ingredients; updating the at least one ingredient database such that each identified ingredient is linked to the determined location thereof on the at least one ingredient database; and providing a step-by-step consecutive set of guidance for a worker to follow while monitoring the worker's food preparation.

A guidance for a step using the first ingredient may comprise displaying a first instruction for processing the first ingredient on the at least one display using data from the at least one recipe database, and turning on at least one of the indicating lights for indicating the first ingredient at a first location linked to the first ingredient on the at least one ingredient database.

When the first food pan containing the first ingredient is moved to a second location on the pan array or the first ingredient is transferred from the first food pan to a second food pan located at the second location, the first ingredient is linked to the second location on the at least one ingredient database with the processes of capturing at least one image of the pan array, processing the at least one captured image and updating the at least one ingredient database may be performed.

A subsequent guidance using the first ingredient may comprise turning on at least one of the indicating lights for indicating the first ingredient at a second location linked to the first ingredient on the at least one ingredient database, rather than the first location. A subsequent guidance using the first ingredient may be for a step in another recipe, for a later step in the same recipe, or for the same step of the same recipe that is run at a later time.

In the foregoing method, the at least one ingredient database may store each identified ingredient, the determined location linked to each identified ingredient, and at least one of the indicating lights that is associated with each determined location. In the method, the step-by-step consecutive set of guidance may comprise guidance for a first step of a recipe followed by guidance for a second step of the recipe after completion of the first step. The at least one camera may further capture images of the preparation table and food being prepared thereon, wherein the completion of the first step is confirmed based on the captured images of the food being prepared on the preparation table and further based on a completion criterion for the first step from the at least one recipe database. The at least one camera may comprise a first camera configured to capture images of the preparation table and a second camera configured to capture images of the pan array.

An aspect of the present disclosure provides a method or use in food preparation. The method comprises: capturing, using at least one camera, images of pizza preparation on a table performed by a person, wherein the pizza preparation comprises a sauce step for spreading sauce on a pizza dough placed on the table, a cheese step for adding cheese over the pizza dough, and a pepperoni step for placing pepperoni slices over the pizza dough. The method further comprises determining whether each of the sauce step, the cheese step and the pepperoni step is completed based on at least part of the captured images real time while the pizza preparation is being performed; and upon determining completion of each of the steps, providing in-situ guidance to the person for the next step or action.

Completion of the sauce step may be determined when the sauce is spread more than a predetermined percentage of a 2-dimensional area of the pizza dough. Determining completion of the sauce step may not use at least one captured image in which the person's hand overlays at least part of the pizza dough.

Completion of the cheese step may be determined when the cheese is placed more than a predetermined percentage of the 2-dimensional area of the pizza dough or a sauced area within the 2-dimensional area. Determining completion of the cheese step may not use at least one captured image in which the person's hand overlays at least part of the cheese.

Completion of the pepperoni step may by determined when the count of pepperoni slices placed over the pizza dough is greater than a predetermined number. Determining completion of the pepperoni step does not use at least one captured image in which the person's hand overlays at least one pepperoni placed over the pizza dough.

Determining the completion of the sauce step may comprise one or more of the following steps: processing a first image among the captured images captured during the sauce step to identify a first group of pixels, each of which is located within an outer boundary of the pizza dough, obtaining the 2-dimensional area of the pizza dough based on the count of pixels of the first group, processing the first image or its modified version to identify a second group of pixels, each of which belongs to a sauce area where the sauce is applied over the pizza dough, obtaining a 2-dimensional size of the sauce area based on the count of pixels of the second group, and computing a percentage of the 2-dimensional size of the sauce area with reference to the 2-dimensional area of the pizza dough.

Determining the completion of the sauce step may comprise one or more of the following steps: processing a second image from the at least one camera or a modified version thereof to locate a first group of pixels each representing the sauced area; obtain the 2-dimensional area of the sauced area based on the numbers of pixels in the first group; processing the second image or the modified version thereof to locate a second group of pixels each representing the cheese; and obtain a 2-dimensional area of the cheese based on the numbers of pixels in the first group; determine the sauce is spread over the predetermined percentage of the 2-dimensional area of the sauced area based on the 2-dimensional area of the cheese.

Determining completion of the pepperoni step may comprise identifying each pepperoni slice placed over the pizza dough, determining if each identified pepperoni is in a size larger or smaller than a predetermined size, and counting the identified pepperoni slices each of which is larger than the predetermined size.

Determining completion of the cheese step may comprise one or more of the following steps: overlaying a grid pattern on the 2-dimensional area of the pizza dough or the sauce area of a second image of the captured images captured during the cheese step, for each grid unit of the grid pattern, determining if the cheese occupies the grid unit based on a color of the grid unit, and counting the number of grid units occupied by the cheese. In determining completion of the cheese step, a representative color may be computed for each grid unit, and the representative color may be compared against a predetermined color value to determine if the cheese occupies the grid unit.

The representative color may be an average of pixel color values of pixels within each grid unit. When the cheese has a first color, and the sauce has a second color, determining that the cheese occupies a grid unit may be based on either or both of the first and second colors.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a flow chart for preparing a pizza according to an implementation.

FIG. 2A illustrates a kitchen system according to an implementation.

FIG. 4D shows a light indicator of the example station of FIG. 4A.

FIG. 5 is a flow chart of overall process of providing food preparation guide to a person according to an implementation.

FIG. 6B illustrates data of food preparation history according to an implementation.

DETAILED DESCRIPTION

Hereinafter, implementations of the present invention will be described with reference to the drawings. These implementations are provided for better understanding of the present invention, and the present invention is not limited only to the implementations. Changes and modifications apparent from the implementations still fall in the scope of the present invention. Meanwhile, the original claims constitute part of the detailed description of this application.

Food Preparation Station

Restaurants use food preparation stations in their kitchens. A typical food preparation station has a food preparation table and food pans containing food ingredients. Restaurant workers (workers) prepare a food on the food preparation table using ingredients from the food pans.

Recipe Guidance and Food Pan Indicating Light

To help workers prepare food, guidance for preparing food may be provided on the food preparation station. Workers may follow such instructions to prepare food. The station may be provided with indication lights for indicating food pans. To help workers locate ingredients quickly, the station may turn on an indicating light to indicate a food pan containing a particular ingredient to be used at a particular step of the instructions. Sometimes, however, the food pan indicated with the indicating light may contain another ingredient, which may confuse workers.

Tracking Changes of Ingredient Location

An enhanced food preparation station may be associated with a system that tracks location changes of the food pans or ingredients contained in the food pans. The system may have the very current location of each ingredient contained in each food pan. Then, the system can use the accurate location of each ingredient from the system and turn on the indicating light(s) for indicating the correct ingredient to be used at each step of the instructions. The configuration and operation of an enhanced food preparation station will be described with reference to an example recipe.

Pepperoni Pizza

FIG. 1 illustrates a flow chart for preparing a pepperoni pizza on a food preparation station before the pizza is baked in a pizza oven or furnace. Step 1 is preparing a dough, which is followed by Step 2 for adding sauce on the dough. Then, at Step 3, cheese is added over the sauce, which is followed by Step 4 for adding pepperoni over cheese. As exemplified, a flow of preparing a pizza includes steps of sequentially stacking a food ingredient over a pizza dough. While a pepperoni pizza recipe is discussed herein, the station can guide a person to prepare different pizzas and various dishes other than pizzas.

Food Preparation System

Food Preparation Station

Figure 2B:
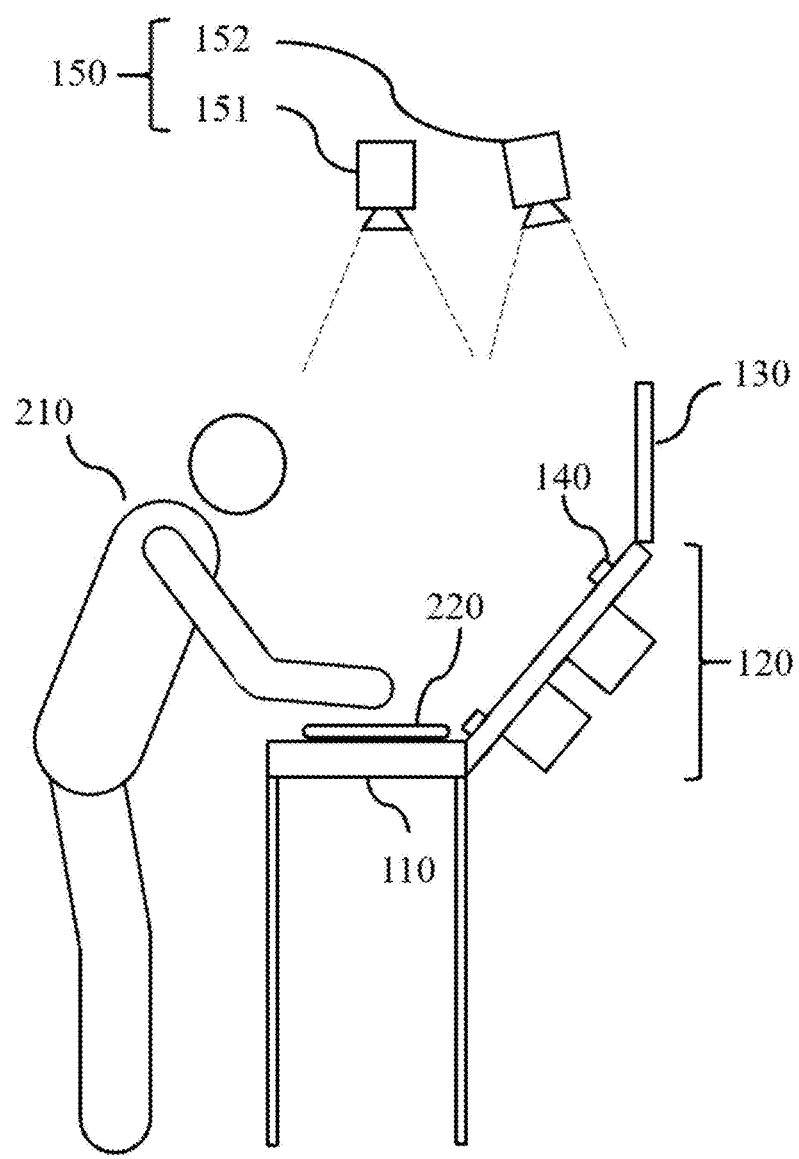
FIG. 2B is a side view of the station of FIG. 2A.
Figure 3:
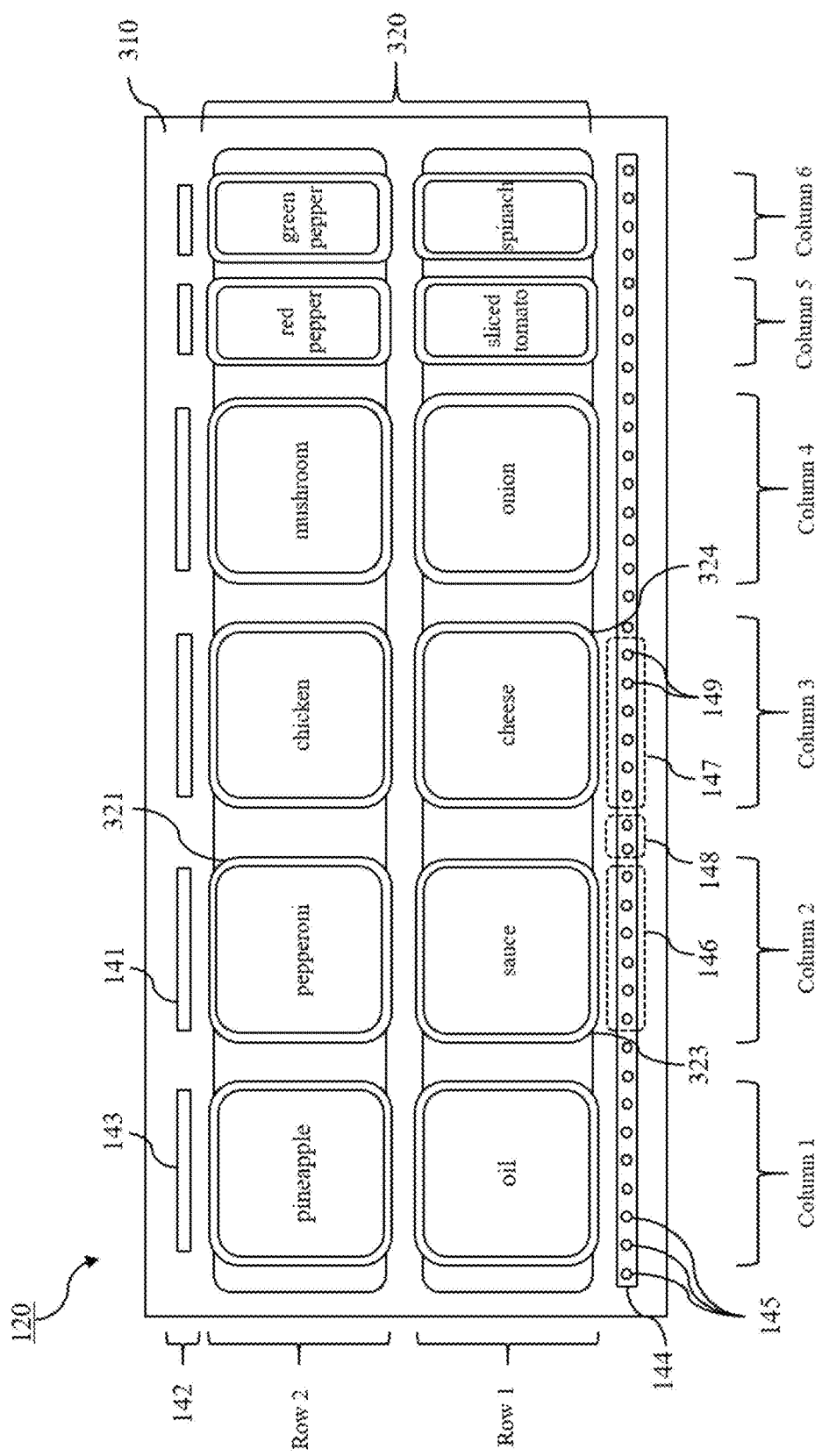
FIG. 3 illustrates a food pan array viewed from the top according to an implementation.

FIG. 2A illustrates a kitchen system according to an implementation. FIG. 2B illustrates a side view of the station of FIG. 2A. FIG. 3 illustrates a food pan array viewed from the top. The food preparation station 100 of FIG. 2A includes a food preparation table 110 and a food pan array 120. The station 100 further includes a display 130, light indicators 140, at least one camera 150, a computing system 160, a database 170, and an ID card reader 180. FIG. 4A to FIG. 4D are photographs of an example food preparation station 4100.

Food Preparation Table

The food preparation table 110 provides a working surface on which food is prepared. FIG. 2B shows a person 210 preparing a pizza 220 on the table 110. The table 110 is adjacent to the food pan array 120 such that the person 210 can pick up food ingredients from the array 120 without having to step toward the array 120. The station of FIG. 4A has a food preparation table 4120 with two pizzas 4121, 4122 being prepared. The table 4120 is sized such that two persons can work at the same time.

Food Pan Array

Figure 4A:
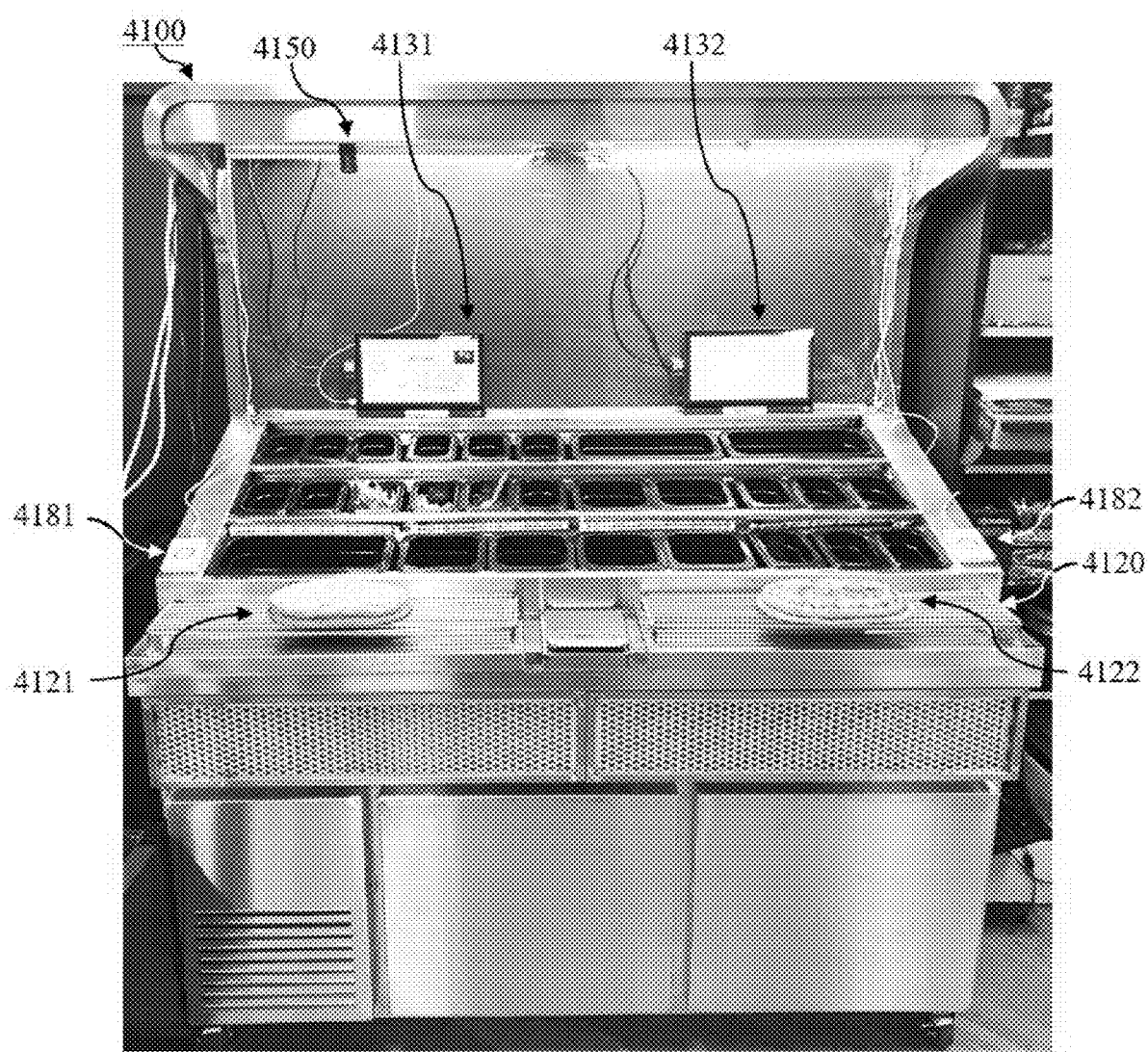
FIG. 4A is a photograph of an example food preparation station according to an implementation.
Figure 4B:
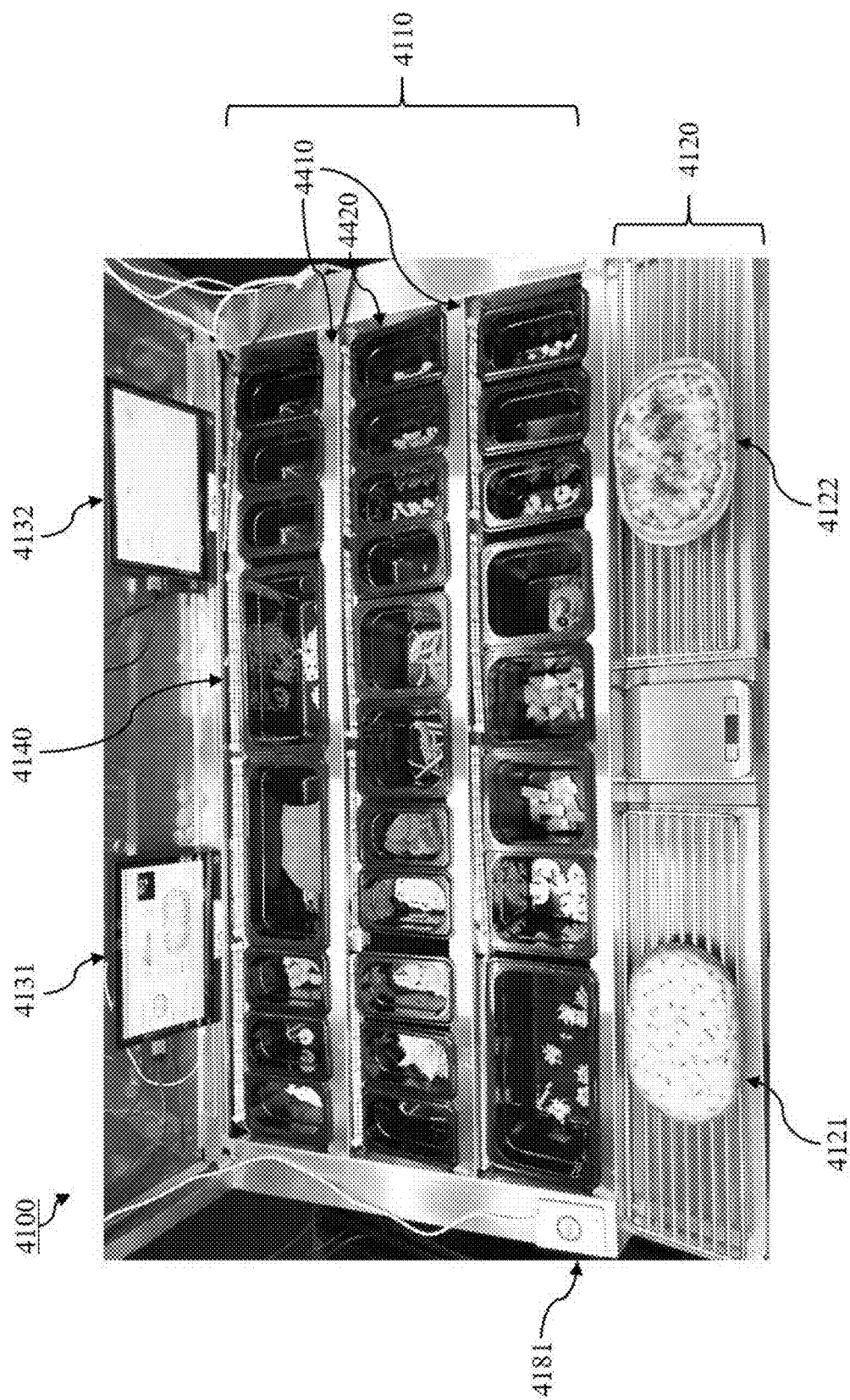
FIG. 4B is a photograph showing a food pan array of the example station of FIG. 4A.

A food pan array is for temporarily storing food ingredients. The food pan array 120 of FIG. 3 includes a frame 310 and a plurality of food pans 320 placed on the frame 310. FIG. 4B shows another food pan array 4110. In the example of FIG. 3, the food pans 320 are arranged in 6 columns and 2 rows. A food pan array may have a different arrangement from the examples.

Food Pans

In an implementation, each one of the food pans 320 is a container for storing one or more food ingredients. The pans may be in the same size or different sizes. The pans may be in the same shape or different shapes. A food pan may be used with or without a lid or cover. FIG. 4B example food pans 4420 containing ingredients to prepare pizzas.

Food Pan Frame—Rail Structure

In an implementation, the frame may have a rail structure on which one or more food pans are placed. Referring to FIG. 4B, the food pan array 4110 have two elongated bars (rails) 4410 on which food pans 4420 are placed in a row. Each food pan has a flange to be slidably placed on the two elongated rails such that each food pan can slide along the rails 4410 and change its location in the array 4110.

Food Pan Frame—Recesses

In an implementation, the frame may include a plurality of recesses (or holes), each of which is to receive one or more food pans. One or more food pans can be placed into each recess. In embodiments, a frame may have a structure different from the examples for holding one or more food pans.

Light Indicators

In an implementation, light indicators are used to visually indicate locations of food ingredients. Referring to FIG. 3, a light indicator 141 is provided above a pepperoni pan 321. When pepperoni is needed for the pizza 220, the indicator 141 may be selectively turned on to draw the person's attention to the pan 321 and to indicate location of pepperoni while the other light indicators are not turned on. Alternatively, to indicate the pepperoni pan 321, the indicator 141 may be turned off while all the other light indicators are turned on.

Location of Light Indicators

In FIG. 2A, for example, the light indicators 140 are installed on the frame 310. In implementations, one or more lights may be attached to a pan of the array 120 such that the lights are visible to the person 210. In implementations, a lighting device such as a spotlight installed over the station may highlight a particular food pan to indicate ingredient contained therein.

Positional Association Between Indicator and Pan

Light indicators may be arranged according to a predetermined layout from which the person 210 can recognize which pan is associated which light and will pay attention to a particular pan when an indicator is on. For example, in FIG. 3, a series of light indicators 142 are installed along an upper edge of the frame 310 and above Row 2 of food pans. The light indicators 142 are sized and arranged such that each indicator is positioned right above its corresponding food pan of Row 2. From the arrangement, the person 210 recognizes that the indicator 141 is associated with the pepperoni pan 321 as it is the closest to the pan 321, and will pay attention to the pepperoni pan 321 when the indicator 141 is on. In FIG. 3, for another example, a light strip 144 is installed along a lower edge of the frame 310 and under Row 1 of food pans, and a group of six lights 146 is right under the sauce pan 323. Turning on the six lights 146 would suggest the person 210 to pay attention to the sauce pan 323 rather than other pans because the sauce pan 323 is the closest pan right above the lights 146.

Indicator not Suggesting a Particular Pan

In FIG. 3, among the lights 145 of the light strip 144, two lights 148 are not distinctively close to a particular pan, and do not overlap any food pan along a column direction. While the system may turn on a group of lights 147 to indicate the cheese pan 324 and turn on another group 146 to indicate the sauce pan 324, the system may not turn on the two lights 148 interposed between the two groups 146, 147. In implementations, the system may not operate an indicator in association with a particular food pan when the person would not recognize that the pan is associated with the indicator from the indicator's location on the frame 310.

Two or More Indicators for a Single Pan

In implementations, two or more indicators are assigned to a single food pan. Referring to FIG. 4D, a light indicator 4140 includes two LED light strips 4141, 4142 installed above a food pan 4421. The two strips 4141, 4142 may operate together or independently to draw a person's attention to the pan 4421. When two pizzas 4121, 4122 are being prepared on the table 4120 as shown in FIG. 4B, the lower strip 4141 may be turned when the pan's ingredient is needed for the left pizza 4121, and the upper strip 4142 may be turned on when the pan's ingredient is needed for the right pizza 4122 although not limited thereto.

Controlling Indicators Referencing to Database

To indicate locations of food ingredients using light indicators, the system may have location information for each indicator and also have information of which indicator is associated which ingredient. In implementations, for each food ingredient, the system stores the location of the ingredient in connection with one or more light indicators that has positional association with the ingredient as exemplified in FIG. 8. When an ingredient is needed to prepare the pizza 220, the system may locate one or more light indicators to turn on based on link between the ingredient and the one or more light indicators on the database.

Operation Modes of Light Indicators

A light indicator may stay turned-on, flashes, or change its color and brightness to indicate location of its corresponding food ingredient or to indicate a status of the food ingredient. The light indicator may operate in a way different from the example to draw the person's attention.

Display

The display 130 is for displaying food preparation information for the person 210 working at the station 100. For example, the display 130 may display one or more of a received order, instructions to prepare an ordered pizza, the current progress of pizza preparation, and a performance feedback after the pizza is prepared.

Location of Display

The display 130 may be placed over the food pan array 100 although not limited thereto. In an implementation, the display 130 may be installed next to the table such that the person can see the pizza 200 and the display 130 at the same time. In implementations, the display 130 is facing the person 210 such that the person can read information on the display while preparing the pizza 220 on the table 110.

Two or More Displays

In an implementation, a food preparation may use two or more displays. In FIG. 4A, the station 4100 has two independent displays 4131, 4132. The left display 4131 may provide guidance for a first person to prepare the left pizza 4121, and the right display 4132 may provide guidance for a second person to prepare the right pizza 4122 although not limited thereto.

Camera

Figure 4C:
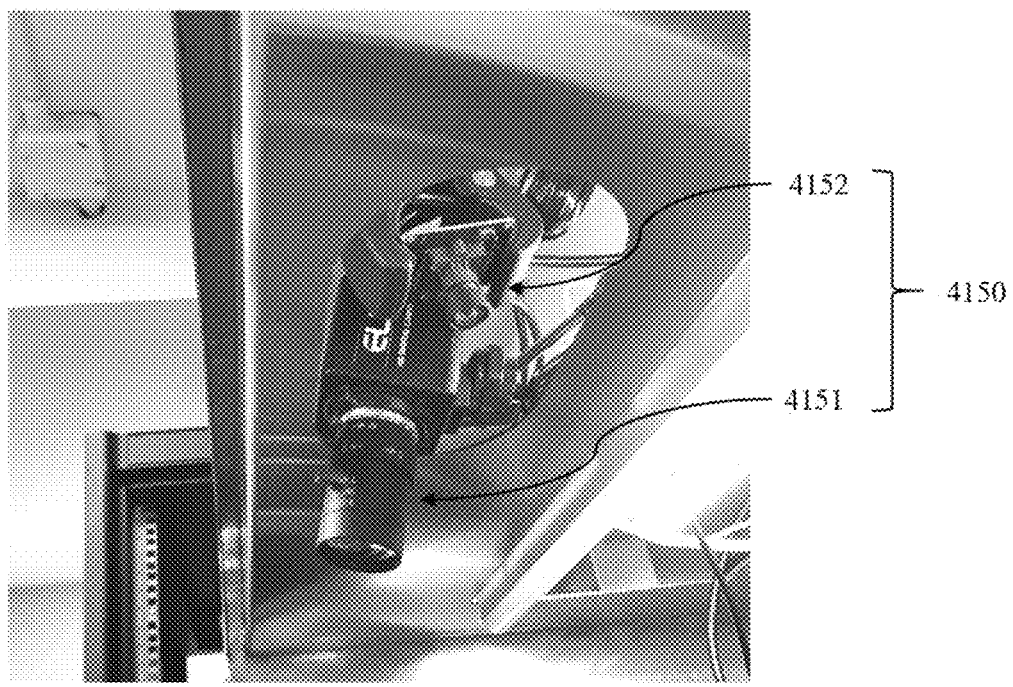
FIG. 4C shows a camera system of the example station of FIG. 4A.

The system includes one or more cameras 150 for capturing images of the table 110 and the array 120. Referring to FIG. 2B, a camera 152 is installed for monitoring food ingredients in the pans 320, and another camera 151 is installed for monitoring the pizza 220 being prepared on the table 110. In an implementation, a single camera may monitor both of the table 110 and the food pan 320. In the station of FIGS. 4A to 4C, a camera 4151 is provided for monitoring food preparation on the table 4120 and another camera 4152 is provided for monitoring food ingredients in the array 4110.

Camera Location

The camera of FIG. 2B is installed over the food pan array 120 and the display 130 to not interfere the person's sight or action. In FIG. 4, the two cameras 4150 are installed over the displays 4131, 4132 and the food pan array 4110. In implementations, a camera system may be at a location different from the examples.

Additional Monitoring Devices

In an implementation, the station 100 includes a device other than a camera to monitor food ingredients or the pizza 220 being prepared. For example, one or more thermometers may monitor temperature of each food ingredient or the pizza. A weight measurement system can be used to measure the weight of the pizza 220 or a food ingredient contained in a food pan. A laser scanner or a light detection and ranging (LIDAR) device may be used for measuring a thickness of a food ingredient (e.g., pizza dough, cheese over the pizza dough) or for measuring location and distribution of an ingredient on the pizza 220. In an implementation, a device other than the examples may be used.

Computing System

The computing system 160 is for process information relating to operation of the station 100. The computing system 160 is connected to the display 130, the light indicators 140, the camera 150, the database 170 and the ID card reader 180. The computing system 160 may communicate with a device outside the station 100. In an implementation, the computing system 160 can be outside a kitchen where the food preparation table 110 is located, and communicates with other devices of the station 100 via a communication network. In an implementation, the computing system 160 communicates with another computing system to obtain information of an order for a pizza. In an implementation, the computing system 160 can use computing power of another system (e.g., cloud computing). An example architecture of one or more computers systems for use with one or more implementations will be described in detail with reference to FIG. 19.

Database

The database 170 is for storing data for providing food preparation guidance. The database 170 may be one or more of a local data store of the computing system 160 and a remote data store connected to the computing system 160 via a communication network. The database 170 may store a plurality of recipes that may be prepared at the station, profiles of worker or person, and history of food preparation works done at the station 100. For each recipe, the database 170 may store information of necessary ingredients, and locations of the ingredients. For each worker or person, the database 170 may store a skill level for each pizza and history of food preparation works. The database 170 may store additional data other than the example, and may not store one or more of the examples. Data stored on the database 170 will be described in detail with reference to other drawings.

ID Card Reader

The ID card reader 180 is for check-in and check-out of the person 210 at the station 100. The station may include 100 includes one or more of an ID card reader, a keypad, and a face recognition system. The station 100 may include a device other than the example devices. FIG. 4A shows two ID card readers 4181, 4182 installed on a frame of the array 4110.

Providing Food Preparation Guidance

FIG. 5 is a flow chart for providing guidance to prepare food, here a pizza. In response to an assignment to prepare a pizza at the station 100, the system may retrieve data of a worker or person, retrieve recipe data of the ordered pizza, and provide guidance according to the retrieved recipe data.

Retrieving Worker Data (S510)

In response to a check-in of the person or worker 210 or upon initiation of ***, the computing system 160 may locate the person's profile on the database 170. The computing system may load data of the located profile on its local memory, or may use data already stored on its local memory without newly retrieving data from the database 170. An example profile of a worker will be discussed with reference to FIG. 6C. This step is optional and may be omitted.

Retrieving Recipe (S520)

In response to an order for the pizza 220 or upon initiation, the computing system 160 locates the pizza's recipe on the database 170 and loads data of the recipe on a local memory. This step S520 may precede the step of retrieving worker data S510. The two steps S510, S520 may be performed in parallel. In an implementation, the computing system 160 uses data stored on its local memory without newly retrieving recipe data from the database 170. An example recipe (pepperoni pizza) will be discussed with reference to FIG. 6A.

Providing Guidance (S530)

Based on the recipe data and the person's profile, the system may provide a food preparation guidance to the person 210. For example, the system may display a text instruction on the display 130, play an audio or video guide, and turn on a light indicator to notify location of a pizza ingredient. The system may provide different instructions based on the person's experience level or work history related to the current recipe. Example data for use in providing food preparation guidance will be described in detail with reference to FIG. 6A to FIG. 6C.

Recipe Data

Recipe Data

Figure 6A:
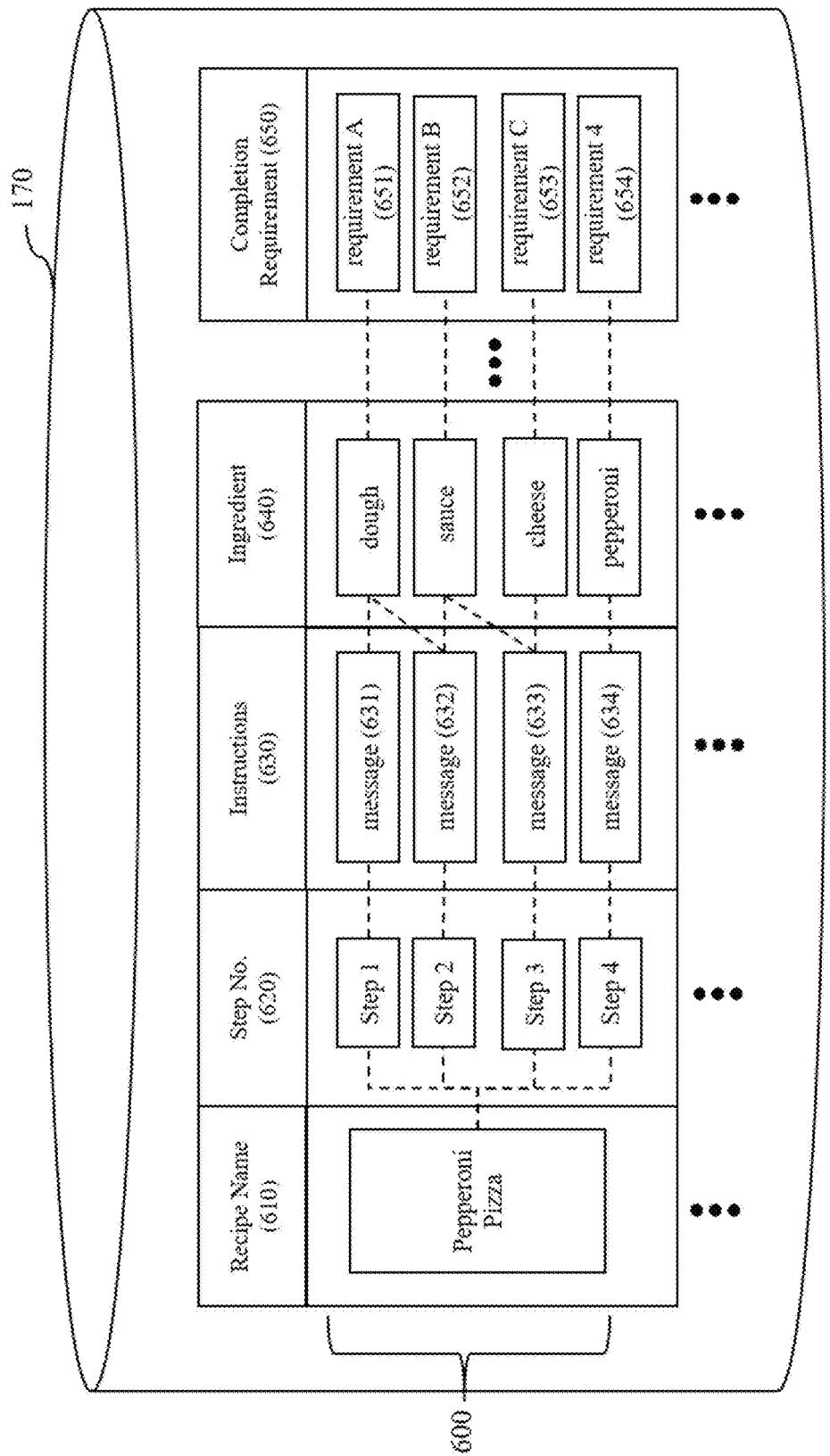
FIG. 6A illustrates data of a recipe according to an implementation.
Figure 6C:
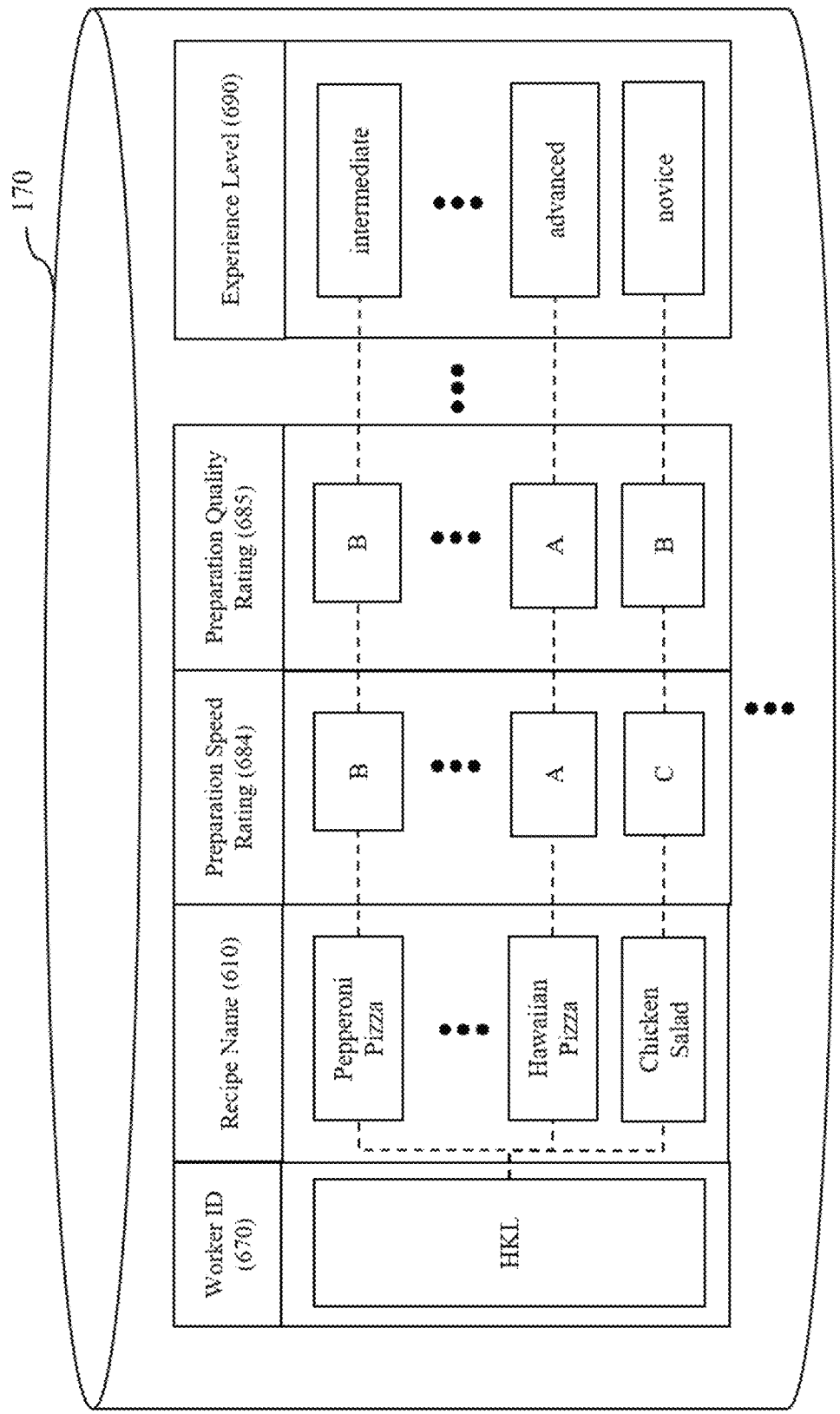
FIG. 6C illustrates data of a person according to an implementation.

FIG. 6A shows data of an example recipe stored on the database 170. FIG. 6B show an example food preparation history. FIG. 6C shows example data of a worker (a station user). According to FIG. 6A, the database stores, for each recipe, recipe name 610, step number 620, instruction 630, ingredient 640 and step completion requirement 650. According to FIG. 6B, the database stores a log of completed orders. For each order, the database stores an order number 681, a recipe name 610, a Worker ID 670, Time of Order Received 682, Time of Order Completed 683, and Preparation Speed Rating 684. According to FIG. 6C, the database stores profiles of workers. For each worker, the database stores a worker ID 670, one or more recipes 610, a preparation time rating 681, and a preparation quality rating 682, and an experience level 680. In implementations, the database stores data in a way different from the example of FIG. 6A to FIG. 6C. The database 170 may store additional data different from the example, and may not store one or more of the example data.

Recipe Name (610)

The recipe name 610 is for uniquely identifying each recipe on the database 170. When an order for 'pepperoni pizza' is received, a corresponding recipe 600 can be located using the recipe's name 610. In an implementation, information other than the name of pizza may be used. For example, a predetermined code of a pizza may be used for delivering order information to the computing system 160, and the computing system 160 locates a corresponding recipe using the predetermined code.

Sequence Number (620)

The example recipe 600 of 'pepperoni pizza' has four steps in total. Each step is numbered according to its order in the recipe, from Step 1 to Step 4. A recipe may have steps fewer or more than four. The database 170 may store the step order in a way different from the example of FIG. 6A.

Instruction (630)

For each step of the example recipe 600, the database may store one or more instructions to help the person 210 during each of the recipe steps. The instructions may include one or more of a text message, an audio message and a video guide predetermined for the recipe step. For example, when the person 210 needs to perform Step 1 (preparing a dough), the system may locate a first message 631 linked to Step 1 and deliver the first message to the restaurant worker.

Text Instructions

In an implementation, the first message 631 includes a text instruction "Prepare a 10-inch dough", the second message 632 includes a text instruction "Place sauce on ¾ of dough", the third message 633 includes a text instruction "Place cheese to cover 90% of sauce", the message 534 includes a text instruction "Place 12 slices of pepperoni". These text messages may be presented on the display 130 to guide a restaurant worker.

Audio and Video instructions

In an implementation, the database stores an audio or video instruction for a recipe step, and the system plays the audio/video instruction at the beginning or during the recipe step. For example, when Step 1 is completed, the system delivers a voice instruction saying "Place sauce on ¾ of dough" for Step 2. For another example, during Step 2, the system may play a video guide showing how to apply sauce repeatedly on the display 130.

Selective Instructions Based on Monitoring of Food Preparation

In implementations, among instructions stored on the database 170, the system may provide one or more instructions selectively based on monitoring of the pizza 220. The system may select one or more instructions among a set of predetermined instructions based on one or more features identified from monitoring of the pizza being prepared. In implementations, the system may generate a new instruction that is suitable for the current status of the pizza 220. For example, during Step 2 (adding sauce), the system may request to add more sauce when it is determined the amount of added sauce is not sufficient to complete Step 2.

Ingredient (640)

For each step of the recipe 600, one or more ingredients are linked on the database 170. For example, Step 1 for preparing a dough is linked to 'dough', and Step 2 for adding sauce is linked to 'sauce'. In an implementation, no ingredient may be linked to a recipe step when the step does not involve addition or removal of an ingredient.

Completion of Recipe Step (650)

For each step of the recipe 600, the database 170 stores one or more requirements to determine whether the step is completed. The requirements may include one or more of (1) a desirable amount or count of an ingredient to be added (or removed) during the current step, (2) a size of an ingredient on the pizza 220, (3) a shape of the ingredient, (4) a desirable position of the ingredient, (5) distribution of the ingredient, (6) distance between individual pieces of the ingredient, (7) a temperature of the pizza 220, (8) a predetermined time limit of the current step, and (9) a quality or status of the ingredient (e.g., freshness, frozen, melt, chopped, deformation). For example, the system may determine that Step 4 (adding pepperoni) is completed when at least 12 slices of pepperoni (each sized greater than a predetermined minimum size) are added on the pizza 220. In an implementation, a requirement different from the examples may be used to determine a completed step.

Evaluating Preparation Quality of Recipe Step

In an implementation, the system may evaluate the quality pizza preparation for each of the recipe step. To evaluate the preparation quality, the system may consider one or more features discussed above for determining step completion. In an implementation, the system may evaluate a recipe step using one or more criteria different the step completion requirements. For example, the system may compute a rating for Step 4 (adding pepperoni) based distribution of pepperoni slices on the pizza 220 when completion of Step 4 is be determined based on the count of the pepperoni slices. In an implementation, the database 170 may store one or more criteria to evaluate a preparation quality of the pizza 220 for each recipe step.

Work History

The database 170 may stores records of orders prepared (or bring prepared) at the station 100. As shown in FIG. 6B, the database 170 may store, for each order, one or more of an order number 681 uniquely identifying the order, the name of ordered pizza 610, an identification 670 of a person who prepared the ordered pizza, a time when the order is received 682, a time when the ordered pizza is prepared 683, and a speed rating of pizza preparation work 684. In an implementation, the database 170 may store a data different from the examples of FIG. 4. In an implementation, the database 170 may store pizza orders prepared at a station other the station 100

Worker ID (670)

The database 170 may stores a worker ID that is uniquely identifying a worker on the database. When a person taps his ID card to the card reader 180, the computing system may obtain the person's ID (HKL) and locate data of the person on the database. In an implementation, as shown in FIG. 6B, a worker ID is linked with orders 681 the worker prepared such that the worker's performance or experience level may be determined based on the person's order history.

Preparation Speed Rating (684)

The system may compute, for each completed order, a rating that represents how fast the ordered pizza had been prepared. The system may compute a preparation time of the ordered pizza using the order received time 682 and the pizza completion time 683, and compares it with a predetermined desirable preparation time for the ordered pizza to determine the speed rating 684. The system may measure the preparation time of the pizza from the start of the first recipe step on the table. In an implementation, the system may measure a completion time and evaluate preparation speed for each recipe step.

Worker Profile

In FIG. 6C, the database 170 stores a profile for each worker of the station 100. For each worker, the database 170 may store one or more of a Worker ID 670, recipe names 610 of pizzas the worker prepared, a preparation speed rating 684 representing the worker's pizza preparation speed, and a preparation quality rating 685 representing the worker's work quality, and an experience level 690 of the worker. In an implementation, the database 170 may store data different from the examples.

Preparation Quality Rating (685)

The system may compute a preparation quality rating representing how properly the worker prepared pizzas in accordance with their predetermined recipes and quality standards. For example, for each recipe of pizzas a worker prepared, the system may evaluate preparation quality for each individual step of the recipe, and compute a percentage of steps satisfying a predetermined quality standard. The preparation quality rating 685 can be determined in a way different from the example.

Experience Level (690)

The database 170 may store an experience level for each recipe linked to the worker ID 670. The experience level for a recipe may be determined based on one or more of the number of pizzas the worker prepared using the recipe, the worker's preparation time rating 684, and the worker's preparation quality rating 685. The experience level may be determined considering another factor different from the examples.

Different Instructions for Different Experience Levels

In an implementation, in providing guidance to prepare the pizza 220, the system may consider the profile of the person 210 preparing the pizza 220 at the station 100. The system may provide different instructions based on one or more of the person's experience level 690 and the ratings 684, 685 about the ordered pizza (its recipe). For example, the system may provide no or limited guidance when the worker is well experienced about the ordered pizza, and may provide a more detailed guidance when the worker has a lower level of experience about the ordered pizza.

Updating Food Ingredient Location

The kitchen system indicates the location of an ingredient within the pan array while food is being prepared. To inform the location, the system needs to have the current location of the necessary ingredient, and the specific light indicator associated with the current location of the ingredient. The system performs a process to keep data current for notifying the locations of food ingredients within the pan array.

Process of Updating Ingredient Locations

Figure 7:
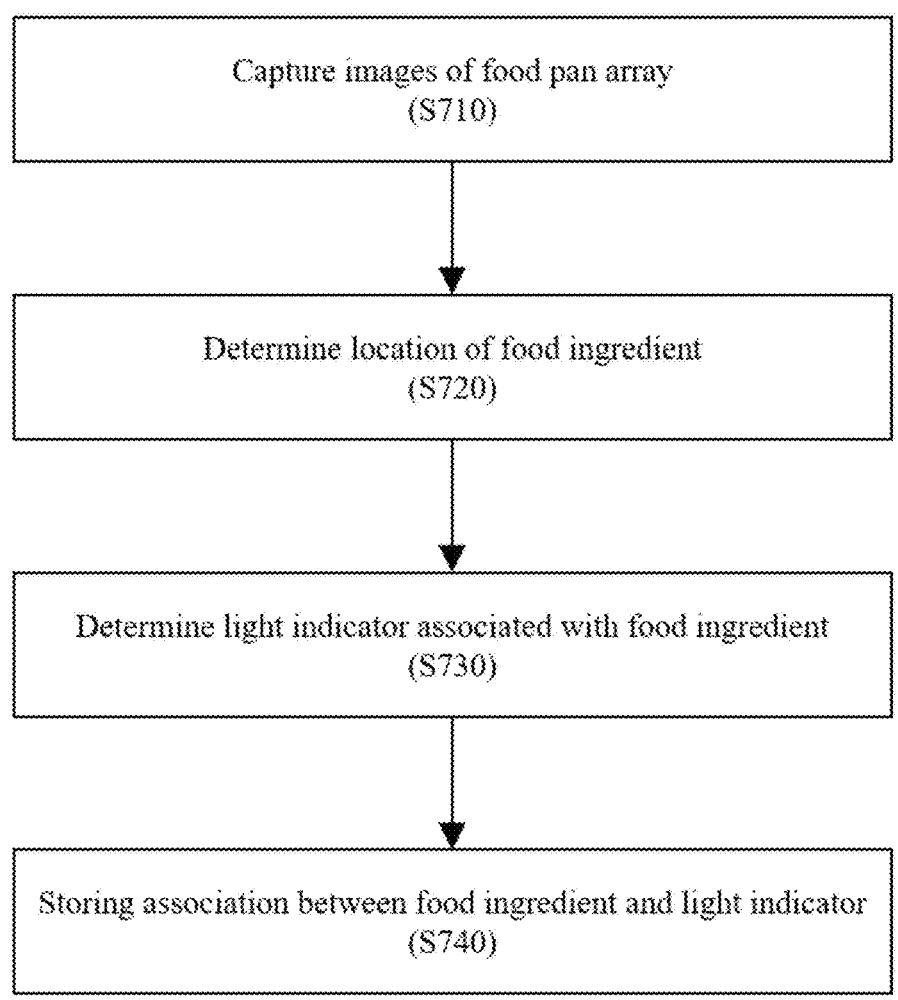
FIG. 7 is a flowchart of determining and storing locations of food ingredients according to an implementation.

FIG. 7 is an example process to update locations of food ingredients. The process includes capturing images of the food pan array (S710), processing captured images to determine the location of each food ingredient (S720), determining one or more indicators associated with the location of each food ingredient (S730), storing association between food ingredients and light indicators on the database 170 (S740).

Capturing Images of Food Pan Array (S710)

At least one camera captures images of the array 120. The images of the array 120 may be captured continuously, periodically or intermittently. The captured images are then sent to the computing system 160 (or another computing device) for further processing. In implementations, the camera 150 may acquire a video of the array 120 continuously, and send at least part of the video frames to the computing system of another computing device.

Identifying Ingredients in Pans

The computing system 160 may process one or more images of the array 120 to identify food pans and food ingredients. In implementations, the computing system 160 with appropriate software processes one or more images to locate each food pan in the images. In implementations, the computing system 160 may perform image segmentation of camera image(s) using a machine-trained model, and identify one or more food pans (or food ingredients) corresponding to segment(s) in the camera images(s). In implementations, for each identified food pan, the computing system may compute one or more features (e.g., color, shape, and size, volume) of its contained material, and determine that a particular ingredient is contained in the pan when the computed feature(s) match the ingredient's feature(s) stored on the database. The system may identify food pans or food ingredients using an approach different from the examples.

Determining Location of Ingredient (S720)

Figure 8:
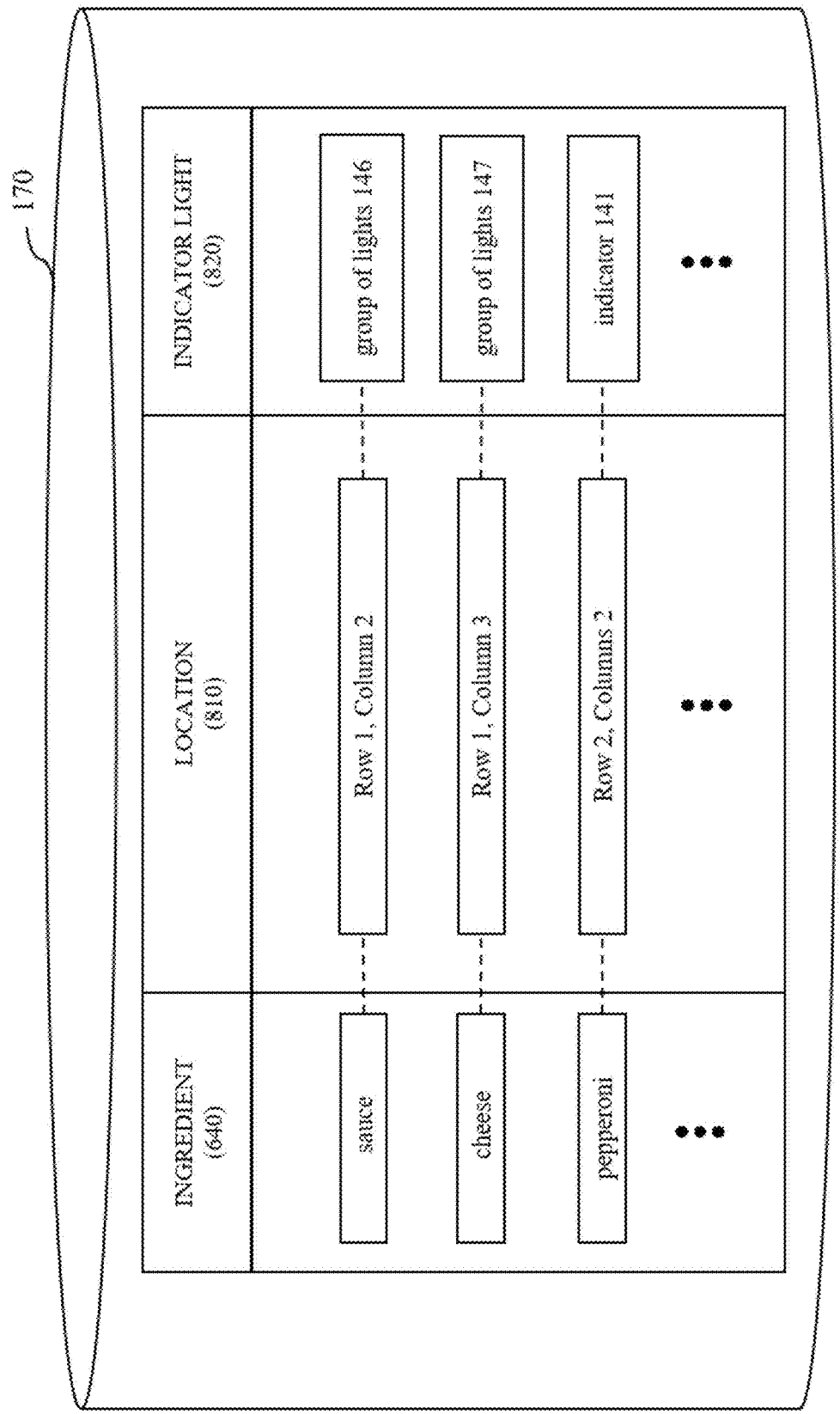
FIG. 8 illustrates data of food ingredients and their locations according to an implementation.

The computing system 160 determines location of each food pan (or food ingredient) identified from processing of the images of the array 120. In implementations, the computing system 160 may process the images of the array 120 to determine a reference (e.g., a corner point, a center point) for each pan and to compute a coordinate of the pan's reference point from a reference point of the frame 310 (e.g., a corner point, a center point). The computing system 160 may store the computed coordinate on the database 170 as the location of the pan's food ingredient. In implementations, when food pans are arranged columns and rows as in FIG. 3, the system may store the location of the pepperoni pan 321 as Row 2, Column 2 as shown in FIG. 8.

Determining Indicator Corresponding to Ingredient (S730)

The system may determine one or more indicators that will draw attention to a particular food pan based on positional relationship between the indicator and the ingredient. Referring to FIG. 3, the light indicators 142, 144 are installed on the frame according to a predetermined layout. The location of the pepperoni pan 321 (Row 2, Column 2) is determined from processing of camera images. The system may assign the indicator 141 to the pan 321 as no other indicator is closer to the pan 321 and no other pan is closer to the indicator 141. In implementations, the system may associate an indicator with a pan when they are within a predetermined distance from each other although not limited thereto. In implementations, the system may use a map of food pan array that defines one or more indicator assignment zones. For each zone of the food pan array, the system assigns at least one light indicator based on positional association between the zone and the indicator such that turning on the indicator would draw the person's attention to the zone. When it is determined that an ingredient (or a pan) is located at an indicator assignment zone, the system associates or links, on the database, the ingredient (or the pan) to the indicator assigned to the zone such that the indicator may be turned on to indicated location of the ingredient.

Updating Database to Store Indicator Associated with Ingredient (S740)

The system may store on the database 170 information of which light indicator is associated with which food ingredient. Each food ingredient may be linked to at least one light indicator on the database. In FIG. 8, for example, cheese is linked to the location of the cheese pan 324 (Row 1, Column 3) which is linked to the light group 147, and accordingly cheese is linked to the light group 147. Based on this association between cheese and the light group 147, the system may operate the light group 147 to indicate the location of cheese in the array 120.

Updating Pan Location Changes Real Time

In implementations, the system may perform the process of FIG. 7 continuously, periodically or intermittently to maintain the database 170 current and to reflect a pan location without delay. The system may perform the process independent of providing step-by-step instructions for the pizza 220. The system may perform the process while it is providing instructions to prepare the pizza 220 such that the system can update the database real-time in response to a pan location change during the preparation of the pizza. The system may perform the process during a waiting time after completing a pizza such that a pan location change is reflected on the database before preparing another pizza.

Responding to Location Change Due to Food Pan Refill

Sometimes, location of a food pan may be moved in the food pan array 120 after refilling the food pan. For example, when the person 210 refills the sauce pan 323 and the cheese pan 324 after preparing a first pizza, the person 210 by mistake may switch locations of the two pans. In response to such pan location change, based on processing of camera images(s), the system updates the database such that the sauce pan 323 is linked to the light 147 and the cheese pan is linked to the light 146. Subsequently when the person 210 prepare a second pizza, the system may turn on the light 147 when sauce is need for the second pizza while it turned on the light 146 when sauce was need for the first pizza.

Monitoring of Additional Feature—Ingredient Amount

Besides monitoring locations of food ingredients, the computing system 160 may processes one or more images from the camera 150 to monitor amount (for example, volume) of each food ingredient. The system may determine whether there are enough ingredients in the food pans considering one or more of a received order, an expected order, and a predetermined amount. When it is determined that a food pan does not store enough food ingredient, the system may provide an instruction to refill the food pan. In an implementation, the system may use a weight sensor, a LIDAR system, or another sensor other than the camera system for monitor amount of a food ingredient.

Step-by-Step Food Preparation Guidance

Figure 9:
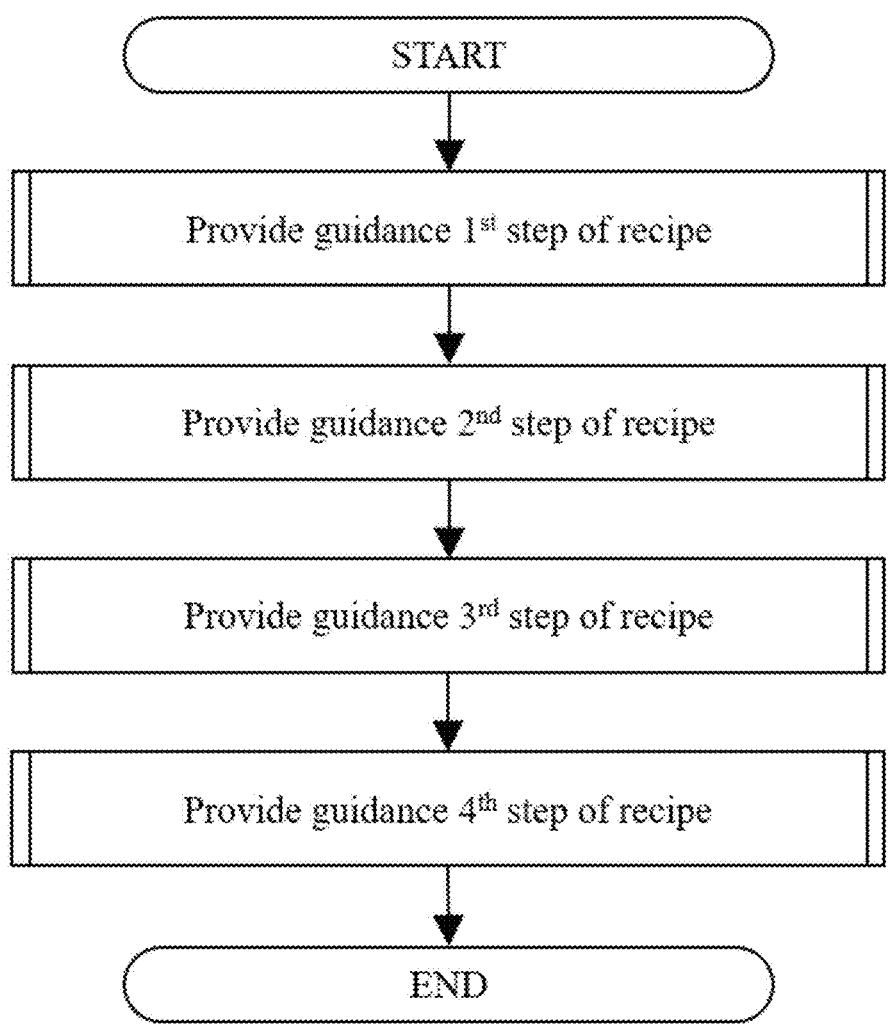
FIG. 9 is a flowchart of providing a step-by-step food preparation guidance according to an implementation.

FIG. 9 is a flowchart of providing a step-by-step food preparation guidance based on the example recipe 600. The system may provide guidance for each step sequentially from the first step (Step 1) to the fourth step (Step 4). Operation of the system for each step will be described in detail referencing to other drawings.

Providing Guidance of Individual Recipe Step

Figure 10:
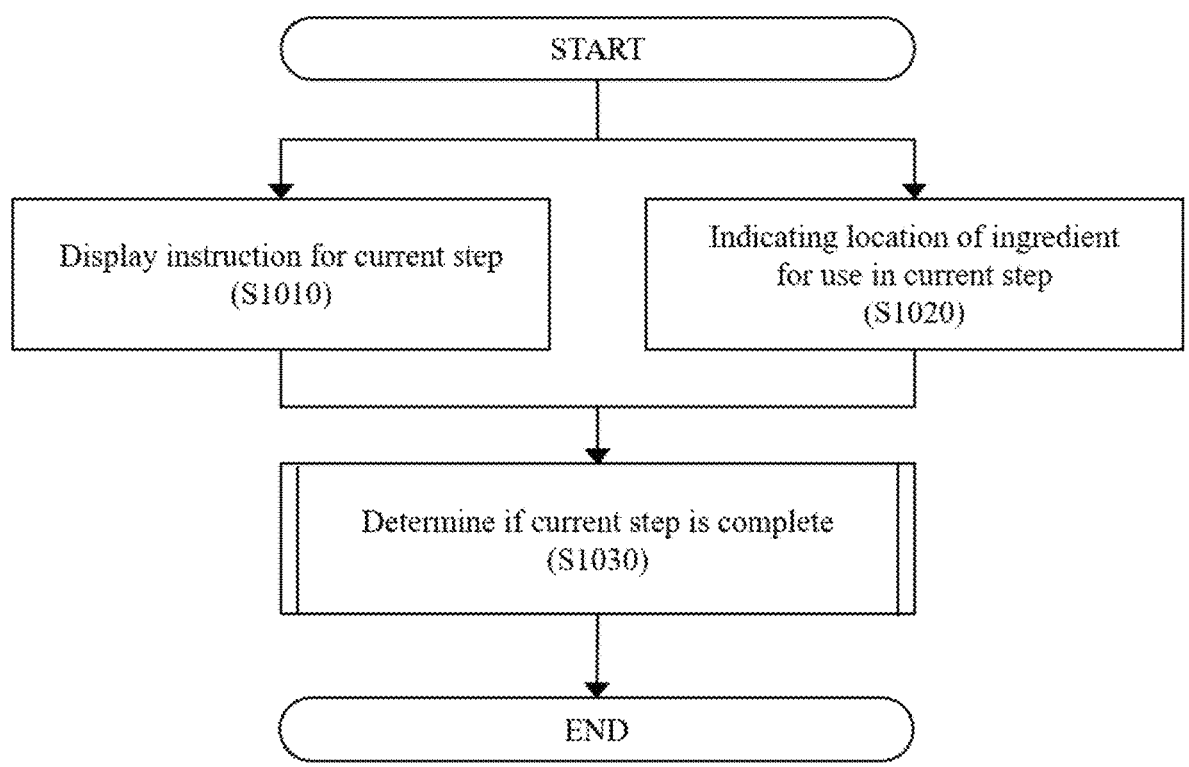
FIG. 10 is a flowchart of providing guidance for an individual step of a recipe according to an implementation.

FIG. 10 is a flowchart of providing guidance for an individual step of a recipe according to an implementation. The process may include providing one or more instructions of the current step (S1010), indicating location of an ingredient necessary for the current step (S1020), and determining if the current step is completed based on monitoring of the pizza 220 being prepared (S1030). The process of FIG. 10 will be explained below using the example recipe 600.

Providing Instruction of Current Step (S1010)

The system may locate one or more instructions 630 linked to the current step on the database 170, and provide the instructions to the person 210 working at the station 100. For example, for Step 1 (preparing dough), the system may retrieve the message 631 linked to Step 1 from the database 170, and control the display 130 to present the retrieved message. In FIG. 12, the text instruction "Prepare a 10-inch dough" is presented on the display 130 for Step 1.

Activating Indicator Associated with Ingredient of Current Step (S1020)

The system may locate, on the database 170, one or more light indicators linked to an ingredient necessary for the current step. To indicate the location of the necessary ingredient, the system may turn on the one or more light indicators, and turn off other indicators that are not linked to the necessary ingredient. For example, for Step 4 (adding cheese), the system refers to the database 170 shown in FIG. 8 to locate the light group 146 that is linked to 'cheese'. Then, the system may turn on the segment 146 of the light strip to indicate location of cheese in the food pan array 100.

Determining Step Completion (S1030)

For each recipe step, the system may determine whether the current step is completed to move on to the next step. The system may locate one or more completion requirements 650 of the current step from the database of FIG. 6A, and may determine the current step is completed when the requirements are satisfied. For example, the completion requirement for Step 4 is to add at least 'twelve' slices of pepperoni. The system may process one or more images of the pizza being prepared, count pepperoni placed, and determine that Step 4 is completed when the count reaches twelve. An example process for determining step completion will be described in more detail referencing to FIG. 11.

Completion of Recipe

Figure 17:
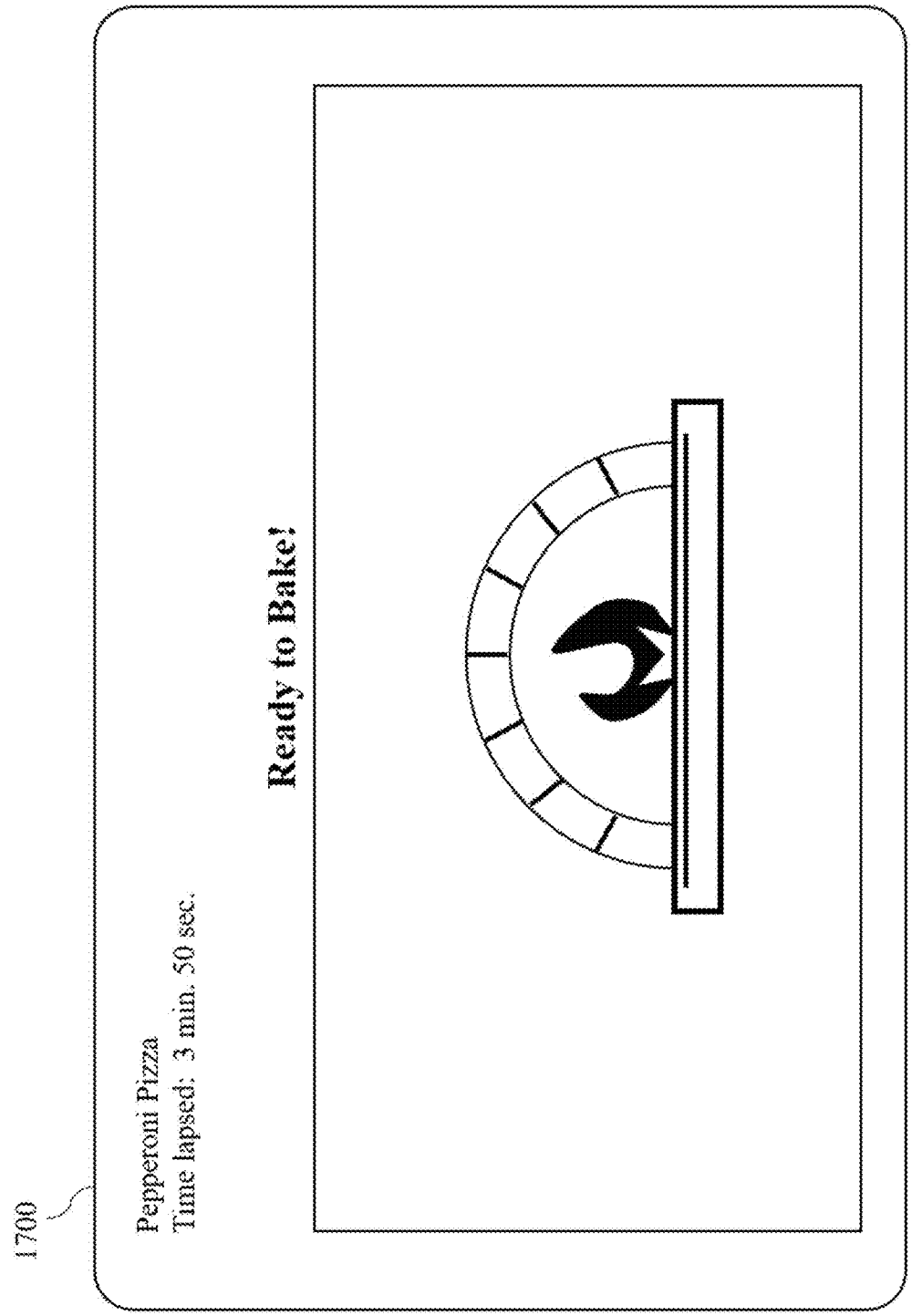
FIG. 17 illustrates a screen notifying a completed food preparation according to an implementation.

In an implementation, when it is determined that the current step is completed, the system turns off indicator lights activated for the current step, and proceeds to provide guidance for the next step of the recipe. The system may provide a notification that the current step is completed. In an implementation, when it is determined that the last step is completed, the system provides a notification that the pizza is ready for serving to a customer or ready for a further processing. An example screen of FIG. 17 shows a notification that all steps at the station 100 are completed and the pizza 220 is ready to bake.

Determining Completion of Individual Recipe Step

Determining Based on Monitoring of Pizza

Figure 11:
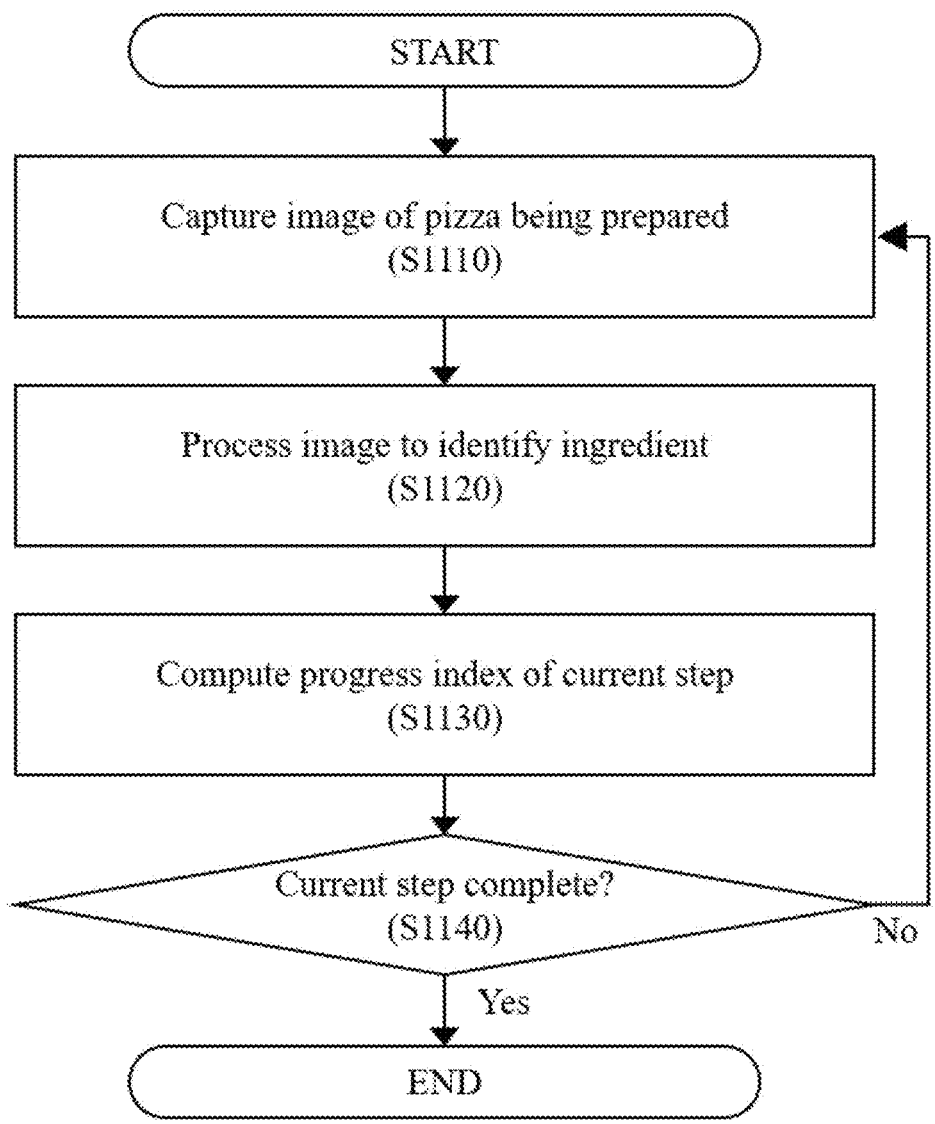
FIG. 11 is a flowchart of determining progress of a recipe step according to an implementation.

FIG. 11 shows a flowchart of determining completion of a recipe step based on monitoring of a pizza being prepared. The process may include capturing images of the pizza 220 being prepared (S1110), processing the images to identify one or more ingredients on the pizza 220 (S1120), computing a progress index of the current step (S1130), determining whether the current step is completed (S1140), and repeating the steps (from S1110 to S1140) when the current step is not completed.

Capturing Images of Pizza Being Prepared (S1110)

One or more cameras may be used to monitor a dish being prepared. Referring to FIG. 2B, the camera 151 may, periodically or intermittently, capture images of the pizza 220 and send the images to the computing system 160 or another computer for further processing. The camera 151 may acquire a video of the table 110 continuously, and send one or more frames of the video to a computing device for further processing.

Image Processing to Identify Food Ingredient (S1120)

The system may process one or more images from the camera 150 to identify one or more food ingredients on the pizza 220 being prepared. In an implementation, the computing system 160 detects an object in an image, determines feature(s) (e.g., color, shape, and size) of the object, and determines a food ingredient when the object's feature(s) matches the food ingredient's data stored on the database. The computing system 160 may use various algorithms other than the examples for identifying food ingredients. In an implementation, the computing system 160 uses a machine-trained model for identifying food ingredient(s) from the camera image(s). For example, the computing system may perform image segmentation of a camera image to find one or more segments each corresponding to an object in the image, to find boundaries separating the segments, and to classify pixels of the images into the segments.

Determining Visible Features of Food Ingredients

In an implementation, the system may process the camera image(s) to determine one or more features for each food ingredient appearing in the camera image(s). For each ingredient, the system may determine one or more of size, count, location and color although not limited thereto. For example, for Step 1 (preparing dough) of the example recipe, the system may compute a size, an area and a color of the dough for use in determining completion of Step 1. For Step 4 (placing 12 slices pepperoni), the system may determine one or more of the number of pepperoni slices added on the pizza 220, the size of each pepperoni slice, and the location of color each pepperoni slice.

Determining Non-visible Feature

In an implementation, the system may determine one or more non-visible features not relying on visual of food ingredients in the camera images. For example, the system may obtain one or more of the temperature of the pizza, the weight of the pizza, and time elapsed for the current step although not limited thereto.

Determining Progress Index (S1130)

In an implementation, the system may compute an index (measure) representing progress of the current step using one or more features obtained from monitoring of the pizza 220 being prepared. The progress index may be based one or more of the visible features, one or more of the non-visible features, and combination of thereof. Example progress indices will be discussed in detail with reference to FIG. 12A to FIG. 16.

Determining Step Completion (S1140)

The system may determine the current step's completion when the current step's progress index reaches a predetermined threshold (e.g., 100%). The system may determine the current step's completion when the completion requirement 650 of the current step is satisfied. Once it is determined that the current step is completed, the system starts to provide guidance for the next step.

Step-by-Step Guidance for Example Recipe

Screen for Dough Preparation Step

Figure 12A:
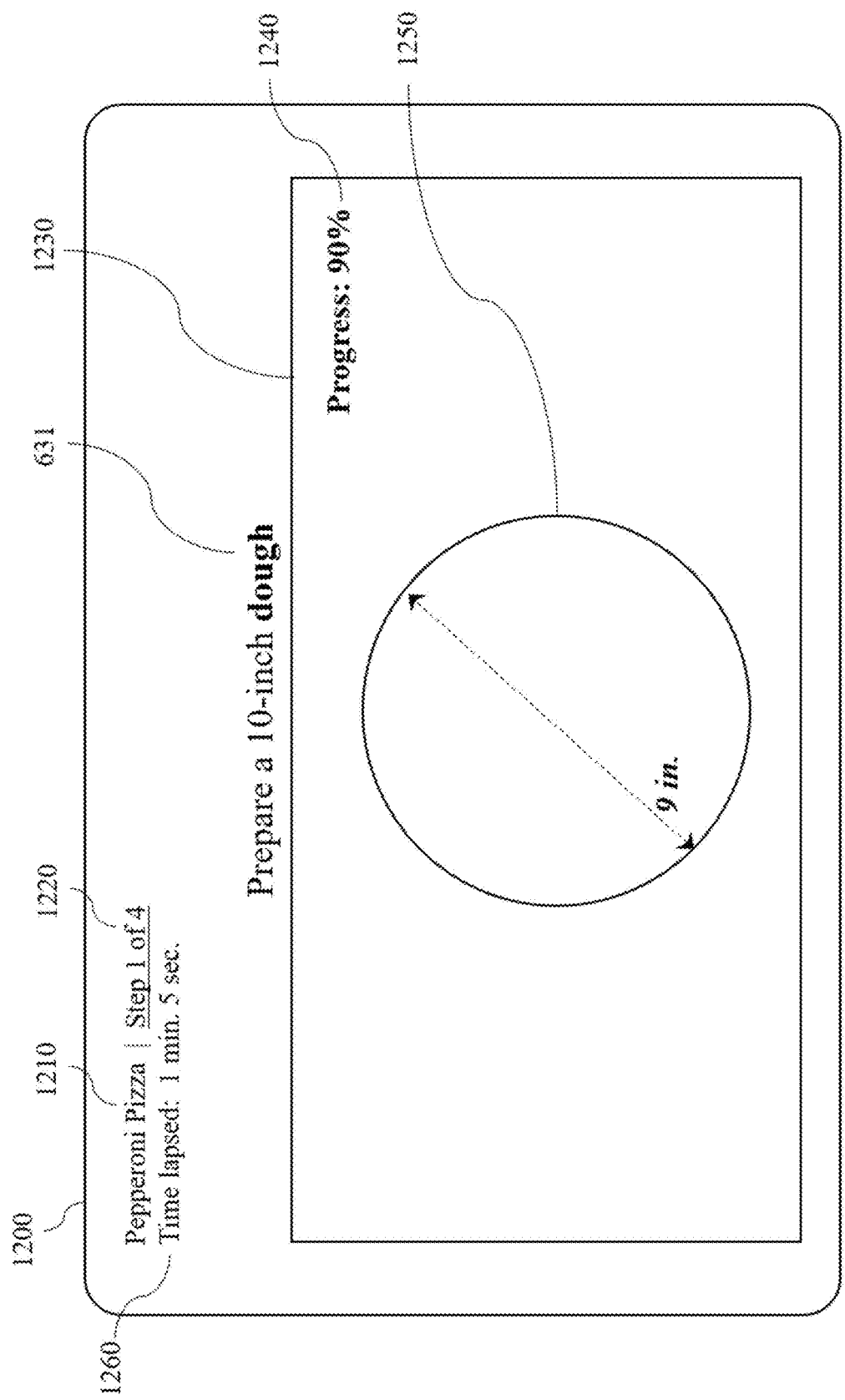
FIG. 12A is an example screen for a dough preparation step according to an implementation.
Figure 12B:
FIG. 12B is a photograph of a pizza dough being prepared according to an implementation.

FIG. 12A is an example screen 1200 for Step 1 (dough preparation) of the example recipe 600. FIG. 12B is a photograph of an example pizza dough. In FIG. 12A, the screen 1200 presents the pizza's name 1210, the current step's number 1220, a text instruction for the current step 631, an image (or a video stream) 1230 of the pizza being prepared, a progress indicator 1240, and time elapsed for the order 1260.

Progress Based on Size of Dough

Step 1 is to prepare a '10-inch' dough. The system may process one or more images of the dough 1250 to compute the dough's size (e.g., length, diameter, 2-dimensional area). The system may compute progress of Step 1 using the computed dough size. In FIG. 12A, the current progress of 90% is computed as a ratio of the computed dough's size (9 inches) with the required size (10 inch) for completing Step 1 although not limited thereto. In an implementation, the system may consider one or more of the dough's shape, 2-dimensional area, thickness, freshness and color to determine progress of Step 1 although not limited thereto.

Completion of Dough Preparation Step

The system may determine completion of Step 1 when the dough's size satisfies Step 1's predetermined requirement. In an implementation, when a pre-baked dough is used for the pizza 220, the system may determine completion of the dough preparation step when the pre-baked dough is placed on the table 110. After determining completion of Step 1, the system starts to provide guidance for the next step in the recipe, Step 2.

Screen for Sauce Adding Step

Figure 13A:
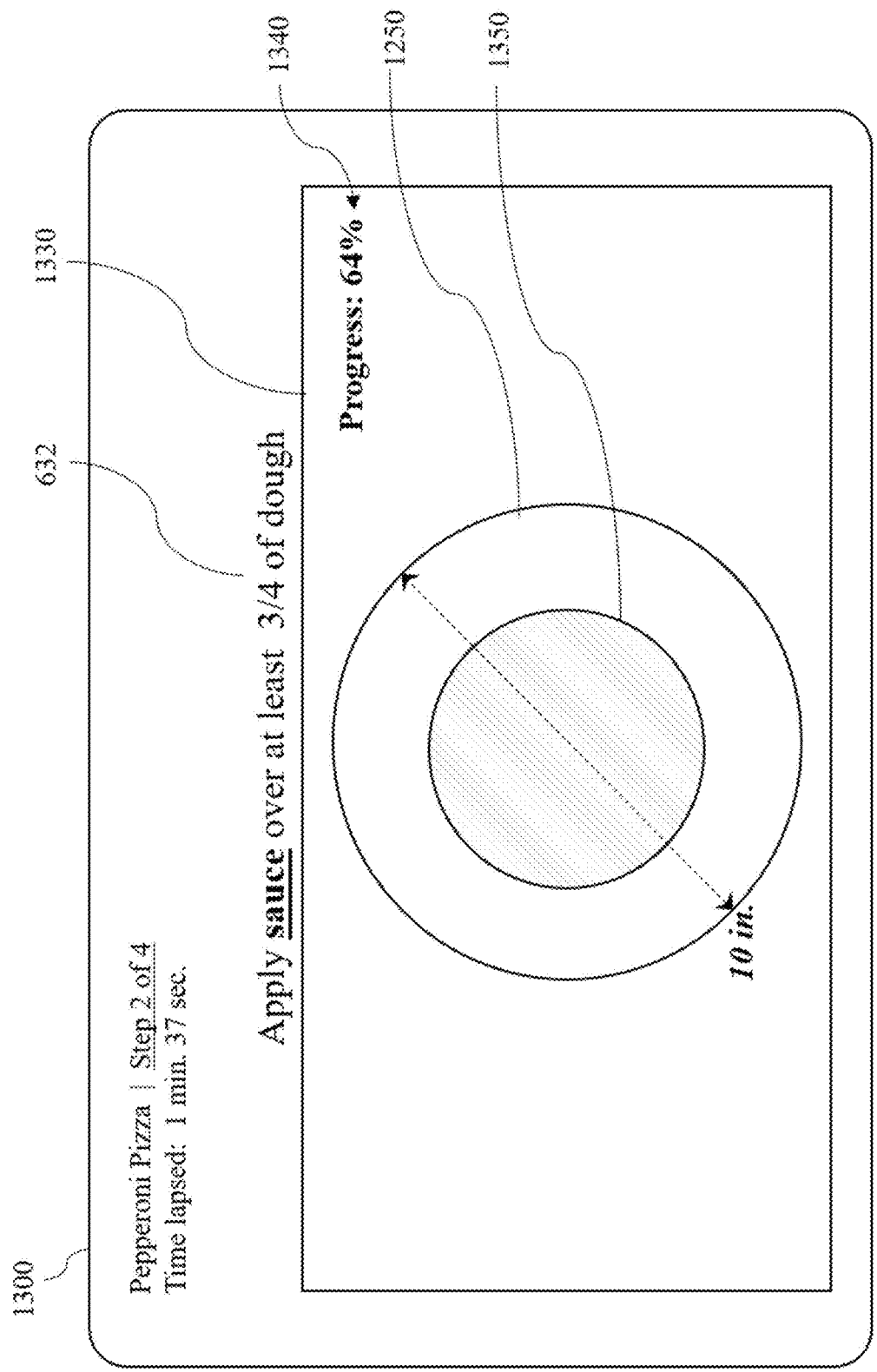
FIG. 13A illustrates a screen for a sauce adding step according to an implementation.
Figure 13B:
FIG. 13B is a photograph of a sauce adding step according to an implementation.

FIG. 13A is an example screen 1300 for Step 2 (applying sauce) of the example recipe 600. Referring to FIG. 13A, the screen presents an image 1330 featuring the dough 1250 prepared at Step 1 and sauce 1350 applied over the dough. The screen may also present an instruction 632 for Step 2 and a progress indicator 1340. FIG. 13B is a photograph of an example pizza dough with sauce added.

Progress Based on Area of Sauce

Step 2 is to apply sauce over ¾ of the dough prepared at Step 1. The system may process one or more images of the pizza being prepared to compute a 2-dimensional area of the dough 1250 and a 2-dimensional area of the sauce 1350 placed on the dough. Using the computed areas, the system may compute a ratio of the sauce area to the required area (¾ of the dough area) as the progress measure of Step 2. In an implementation, the system may compute the dough's area assuming the dough is in a circular shape and using the diameter of the dough. In an implementation, as shown in FIG. 13B, the system may draw a box 1371 surrounding a dough 1372, and may use the box's area for computing the progress measure. The system may use a processing different from the examples.

Image Segmentation to Identify Sauced Area

In implementations, the system may process the image 1330 using a machine-trained model to identify a first group (segment) of pixels as the sauced area 1350 and to identify a second group (segment) of pixels as the dough 1250 that is not cover with the dough. The system may compute an area of the sauced area 1350 using the number of pixels in the first group, compute an area of the dough using on the number of pixels in the second group, and compute a ratio between the two areas for evaluating progress of Step 2. If the first group (sauce) is of 600 pixels in the image 1330 and the second group (dough not covered with the sauce) is of 400 pixels, the system may determine that 60% of the dough is covered with the sauce.

Completion of Sauce Placing Step

The system may determine completion of Step 2 when the sauced area 1350 is larger than a predetermined percentage of the 2-dimensional area of the dough. In an implementation, the system may determine completion of Step 2 using a criterion other than the area ratio.

Example Screen for Cheese Adding Step

Figure 14A:
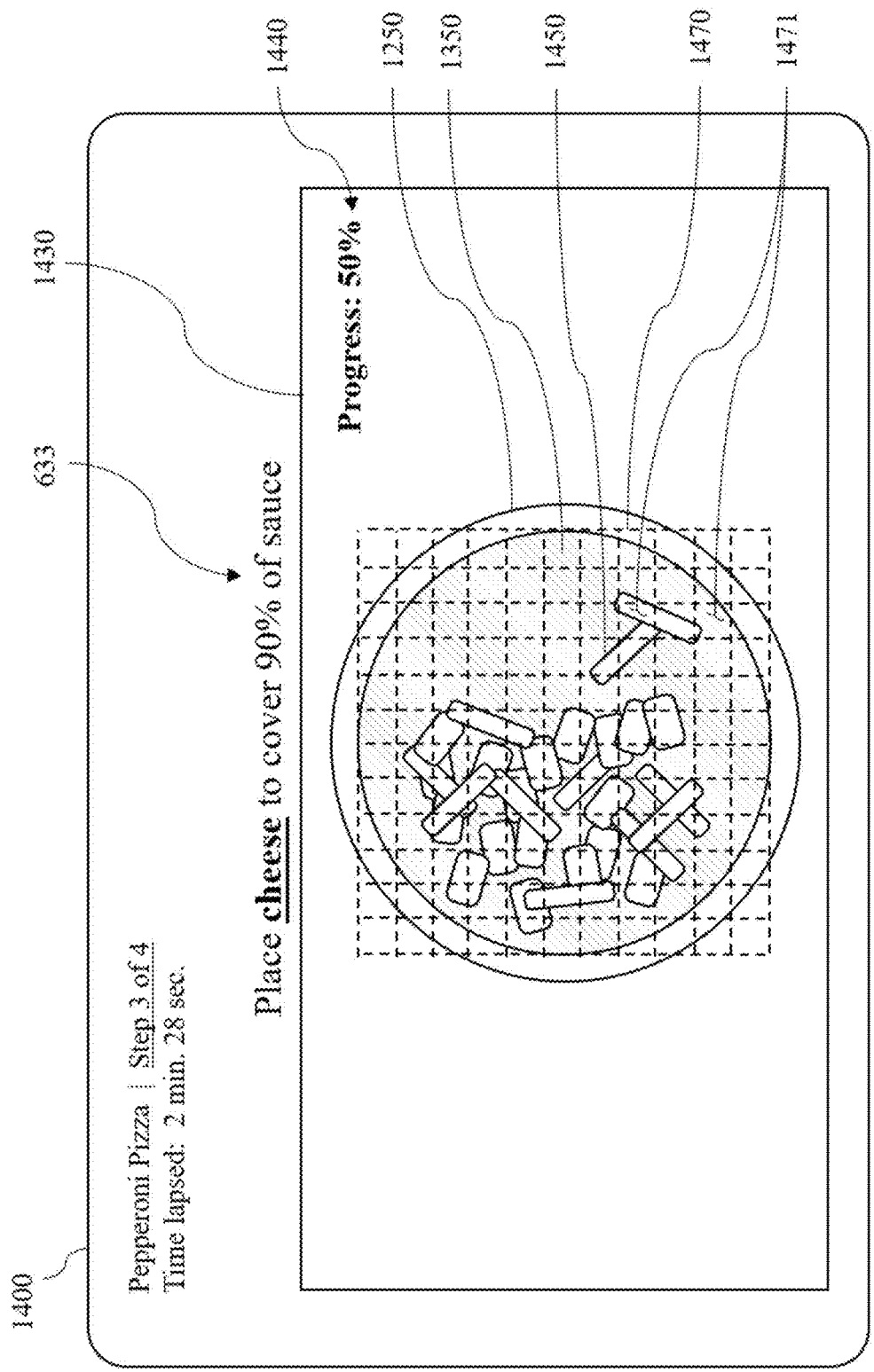
FIG. 14A is an example screen for a cheese adding step according to an implementation.
Figure 14B:
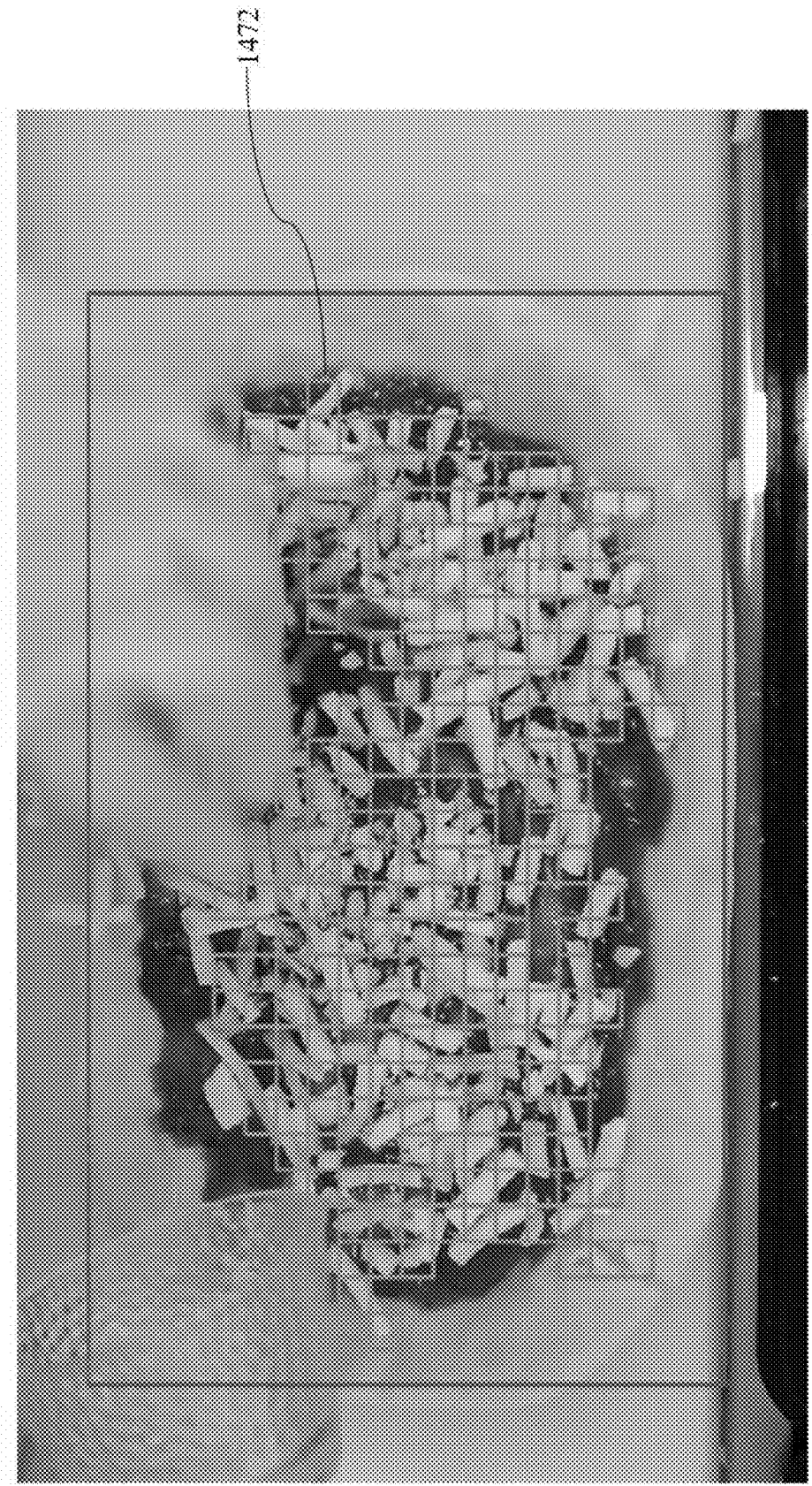
FIG. 14B is a photograph of a cheese adding step according to an implementation.
Figure 14C:
FIG. 14C is another photograph of a cheese adding step according to an implementation.

FIG. 14A is an example screen 1400 for Step 3 (adding cheese) of the example recipe 600. Referring to FIG. 14A, the screen presents an image 1430 featuring the dough 1250 prepared at Step 1, the sauce 1350 applied at Step 2, and cheese 1450 added over the dough. The screen also presents the instruction 633 for Step 3 and a progress indicator 1440. FIG. 14B is a photograph of a pizza when cheese is being added. FIG. 14C is another photograph showing a cheese adding process.

Computing Progress of Cheese Adding Step

Step 3 is to place cheese to cover 90% of sauce. The system may process one or more images of the pizza being prepared to compute a 2-dimensional area of the sauce 1350 and a 2-dimensional area of cheese added the sauce 1350. The system may compute a ratio of the area of cheese to the area of the sauce as the progress measure 1440 of Step 3. A different process may be used to compute the progress measure.

Virtual Grid to Compute Progress of Cheese Adding Step

In an implementation, the system may use a grid of virtual segments to determine how much cheese is placed on the sauce 1350. In FIG. 14A, the system overlays the grid 1470 over the sauced area 1350 to virtually partitioning the sauced area into a plurality of sauced segments 1471. For each unit segment, the system determines whether it is covered with cheese or not, counts the number of cheese-covered segments, and computes a ratio of the cheese-covered segments to the entire sauced segments as the current progress 1440 of Step 3. In determining a cheese-covered segment, the system identifies a cheese-covered portion inside a segment based on the color of cheese and the color of sauce, and determines the segment is a cheese-covered segment when the cheese-covered portion is greater than a predetermined percentage of the segment area. In an implementation, the system identifies compute a representative color (e.g., average) of the segment, and determine the segment is a cheese-covered segment when the average color is closer to that of the cheese although not limited thereto. In FIG. 14B, each of the green boxes 1472 represents a cheese-covered segment. In an implementation, the system may compute a progress index of Step 3 using a process different from the example.

Image Segmentation to Identify Cheese

In implementations, the system may process the image 1430 using a machine-trained model to classify a first group (segment) of pixels as cheese, a second group (segment) of pixels as sauce. The system may count the number of pixels for each group in the image 1430 (or its modified version), compute a 2-dimensional area for each group, and determine progress of Step 3 using the pixel counts and the computed areas. For example, if the first group (cheese) is of 300 pixels in the image 1430 and the second group (sauce on the dough) is of 700 pixels, the system may determine that 30% of the sauce is covered with the cheese.

Completion of Cheese Adding Step

In an implementation, the system may determine completion of Step 3 when cheese is placed more than a predetermined percentage of the 2-dimensional area of the pizza dough or a sauced area within the 2-dimensional area (when the computed progress reaches 100%) although not limited thereto. Subsequent to completion of Step 3, the system may provide an instruction to start Step 4.

Example Screen for Pepperoni Adding Step

Figure 15A:
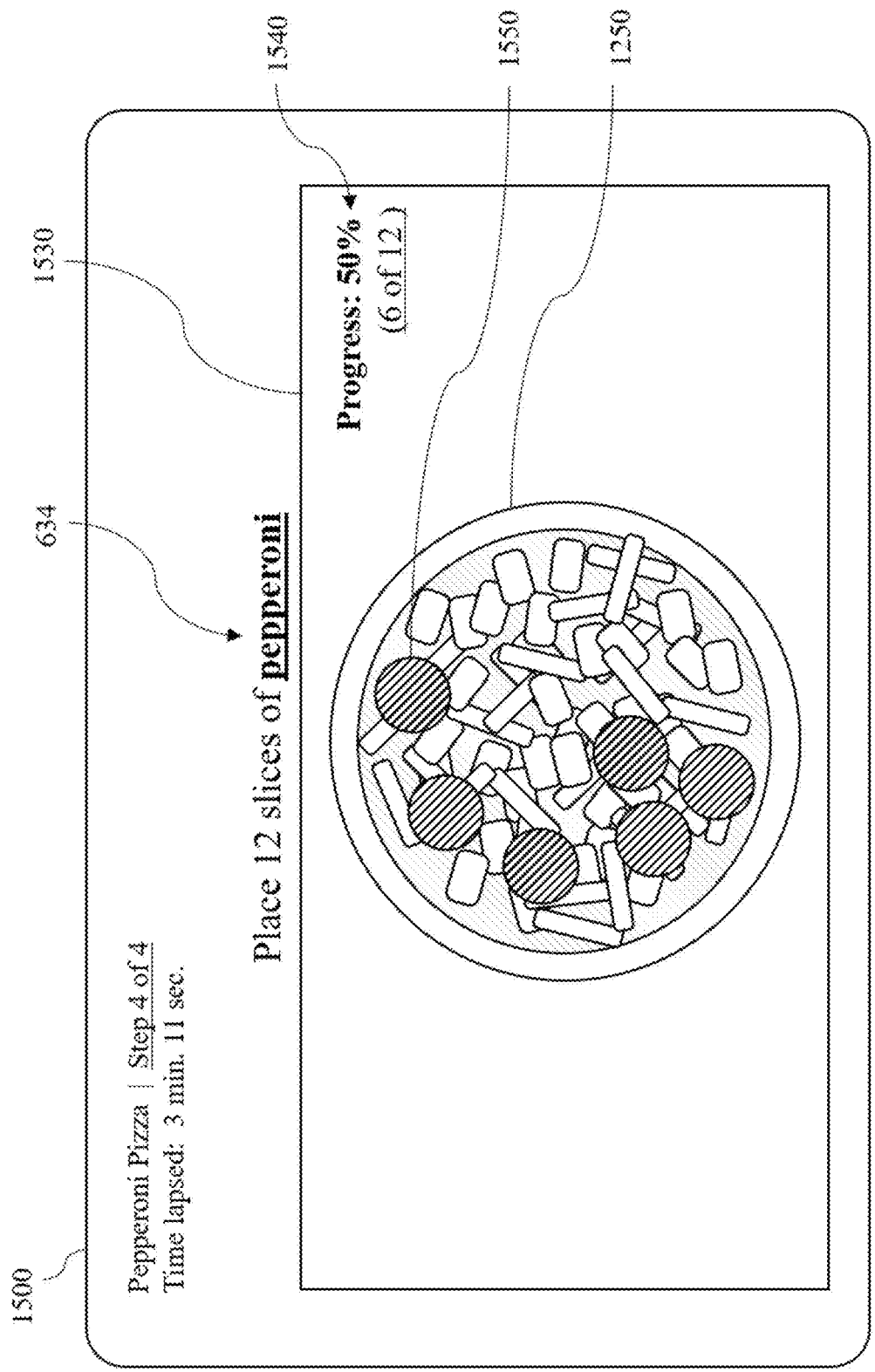
FIG. 15A is an example screen for a topping adding step according to an implementation.
Figure 15B:
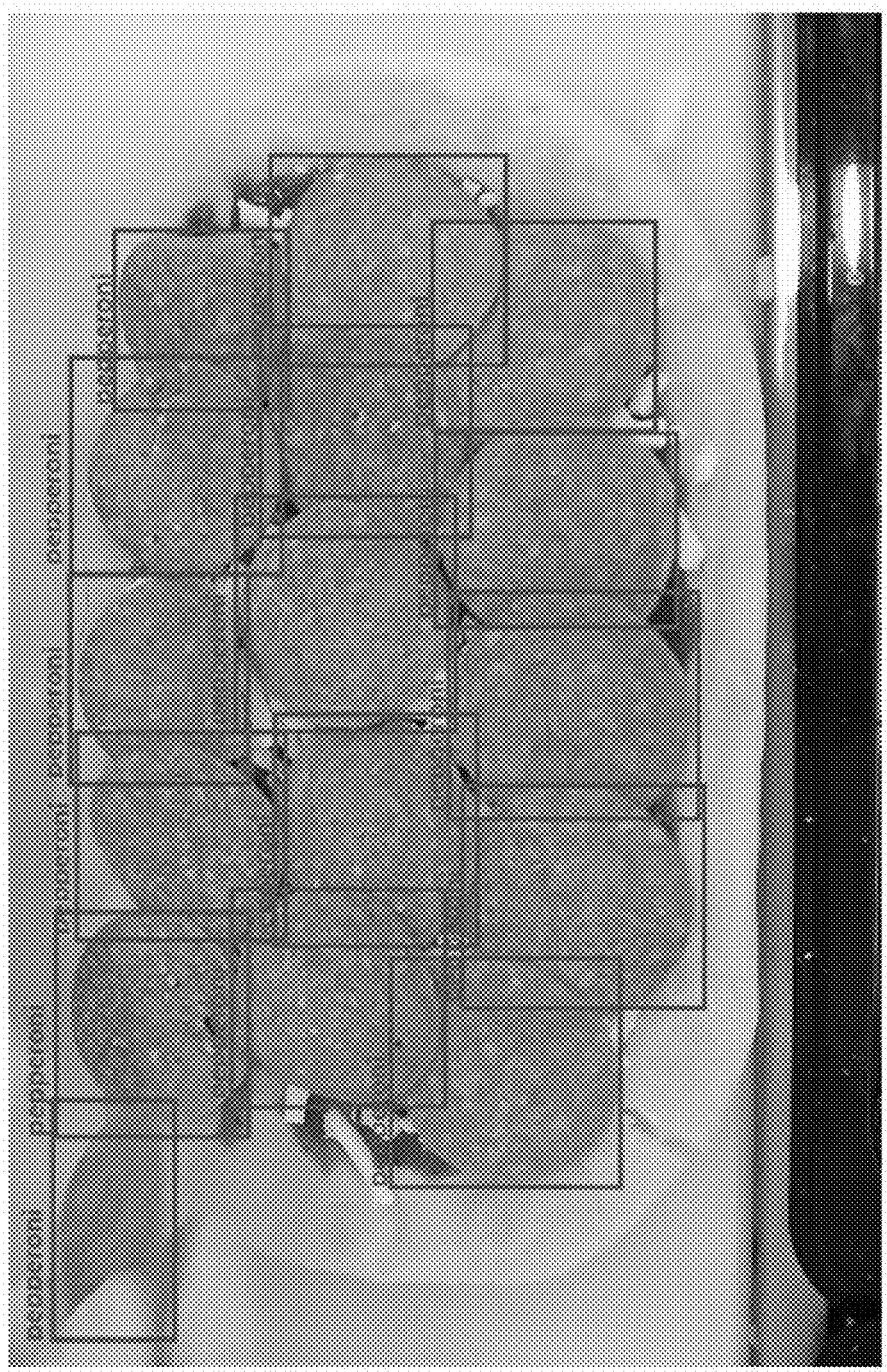
FIG. 15B is a photograph of a topping adding step according to an implementation.

FIG. 15A is an example screen for a pepperoni adding step. The screen 1500 presents a current image 1530 featuring the dough 1250, the sauce 1350, and cheese 1450 prepared at Step 3. The screen also presents an instruction 634 for Step 4 and a progress indicator 1540. FIG. 15B is a photograph of a pepperoni pizza being prepared.

Progress Based on Counting of Pepperoni

Step 4 is to add 12 slices of pepperoni over the cheese place at Step 3. The system may process a current image of the pizza to identify pepperoni slices and to count pepperoni slices added over the cheese. In FIG. 15A, the current progress of Step 4 (50%) is computed as the ratio of the current number of pepperoni slices (six) to the predetermined number (twelve) although not limited thereto. In an implementation, the system may count a pepperoni slice when it is greater than a predetermined size. The system may not count a pepperoni slice when it does not meet a predetermined requirement for pepperoni.

Determining Completion of Pepperoni Adding Step

The system may determine completion of Step 4 when the count of pepperoni slices reaches the predetermined number of twelve although not limited thereto. Subsequent to completion of Step 3, the system may provide an instruction to bake the pizza (FIG. 17).

Progress Index when Food is not Fully Visible

Figure 16:
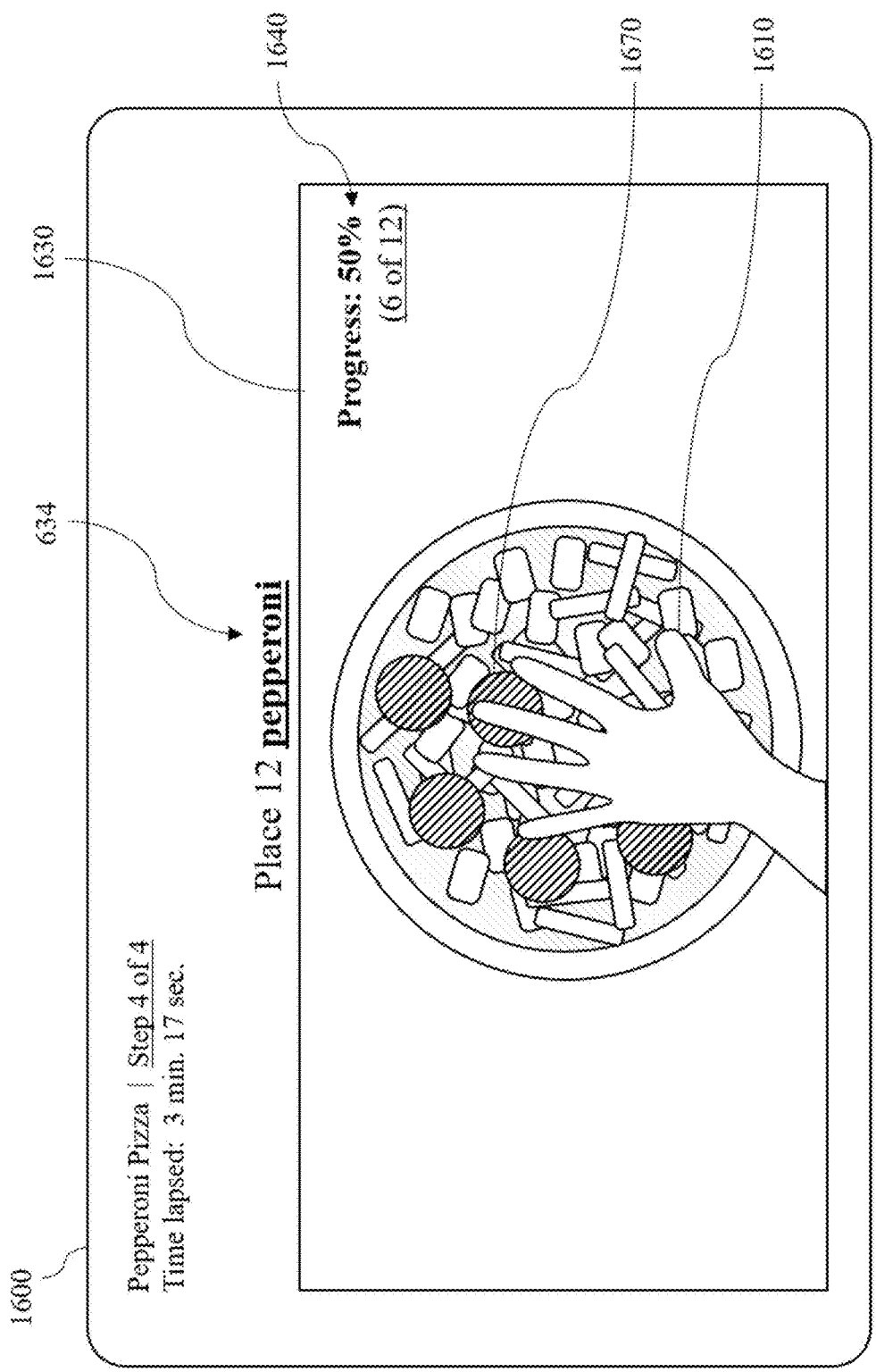
FIG. 16 illustrates a screen for a topping adding step according to an implementation.

FIG. 16 shows another example screen 1600 of Step 4 that is subsequent to the screen 1500. In FIG. 16, a hand 1610 is adding the seventh pepperoni slice 1670 to the pizza of the image 1530 (having 6 pepperoni slices), but only five pepperoni slices are visible in the image 1630. If a progress index of Step 4 is computed based on the number of currently visible pepperoni slices, the progress should lower than the 50% shown in FIG. 15A. It may confuse the person 210 if the system lowers the progress index real-time when a hand is obstructing the camera's view. To avoid such confusion, the system may not update a progress index when the pizza being prepared is not fully visible. In an implementation, the computing system 160 processes a camera image to determine the food being prepared is fully visible in the image, and does not consider the image for computing a progress index or evaluating a food preparation quality when the pizza is not fully visible.

Computing Progress Using Machine-Trained Model

For example, the system uses a machine-trained model to compute a progress for a recipe step and to determine completion of the recipe step. In an implementation, the system may train a model such that the model outputs a progress index of a recipe step in response to an input of an image of a pizza being prepared. For example, the system uses a machine-trained model configured to determine completion of Step 3 in response to an image featuring cheese covering a sauced dough.

Recipe Completion Message

When the last step of a current recipe is completed, the system may present a screen that the food is ready for serving or for a further processing. FIG. 17 is an example screen 1700 notifying that a pizza prepared at the system is ready to bake.

Performance Feedback

Figure 18:
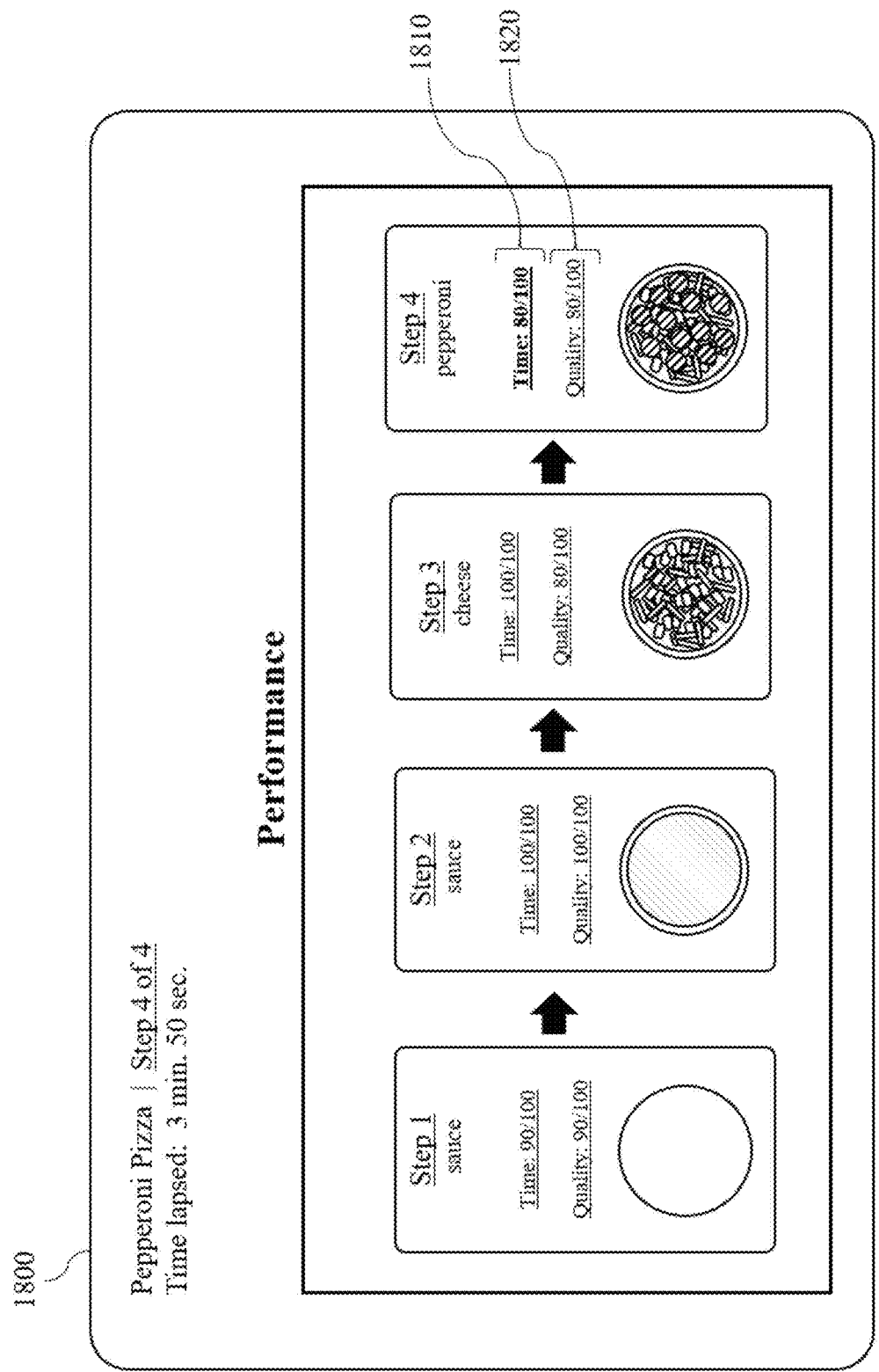
FIG. 18 is an example screen to provide performance feedback according to an implementation.

FIG. 18 is an example screen 1800 provided after completing all four steps of the example recipe. The feedback screen 1800 includes, for each step, (1) a first performance indices 1810 based on preparation time and (2) a second performance indices 1820 based on preparation quality. In an implementation, the system may provide an additional performance index, and may not provide one or more of the example performance indices.

Performance Rating Based on Preparation Time

In implementations, when a person performs each step of the recipe, the system collects data to evaluate the person's performance for each step. For example, the system measures a completion time for each step, compares the measured completion time with a predetermined desirable completion, and computes a performance index representing how fast the worker completed the step. In an implementation, the system updates the person's preparation time rating 693 using the first performance indices 1810.

Performance Based on Preparation Quality

In implementations, at the end of each recipe step, the system evaluates the step using one or more criteria for determining a properly-performed step. Examples of the criteria were explained in connection with example recipe data. In an implementation, for Step 2, the system computes a performance index representing how evenly the sauce spreads on the dough. In an implementation, the system updates the person's preparation quality rating 693 using the second performance indices 1820.

Machine-Trained Model (Artificial Intelligence)

In implementations, the computing system 160 uses a machine-trained model for determining location of a food ingredient, and monitoring progress of a recipe step.

Machine-Trained Model for Identifying Food Ingredients

A machine-trained model of an implementation is configured to, in response to an input of data of a photographic image, output information of one or more food ingredients featured in the photographic image. In an implementation, the system may use a machine-trained model configured to perform image segmentation of a camera image for identifying objects (pans, food ingredients) in the image.

Data Set for Training Machine-Trainable Model

A data set for training of a model includes a number of data pairs. Each pair includes input data for the training machine-trainable model and desirable output data (label) from the model in response to the input data. For example, for a machine-trainable model to identify food ingredients, the input data includes an image of a predetermined size that features one or more food ingredients, and the desirable output data includes one or more identifiers (names) of the featured food ingredients. For another example, for a machine-trainable model to evaluating progress of a recipe step, the input data includes images of food being prepared, and the desirable output data includes a percentage indicating progress of a food preparation step.

Training of Machine-Trainable Model

In an implementation, a supervised learning technique can be used to prepare the machine-trained model. Any known learning technique can be applied to the training of the model as long as the technique can configure the model to output, in response to training input images, a name (identifier) of food ingredient within a predetermined allowable error rate.

Various Structure of Machine-Trained Model

In an implementation, a convolutional neural network (CNN) is used to construct the machined trained model. In general, a convolutional neural network requires a smaller number of model parameters when compared to a fully connected neural network. In an implementation, a neural network other than CNN can be used.

Computing System

General Architecture

Figure 19:
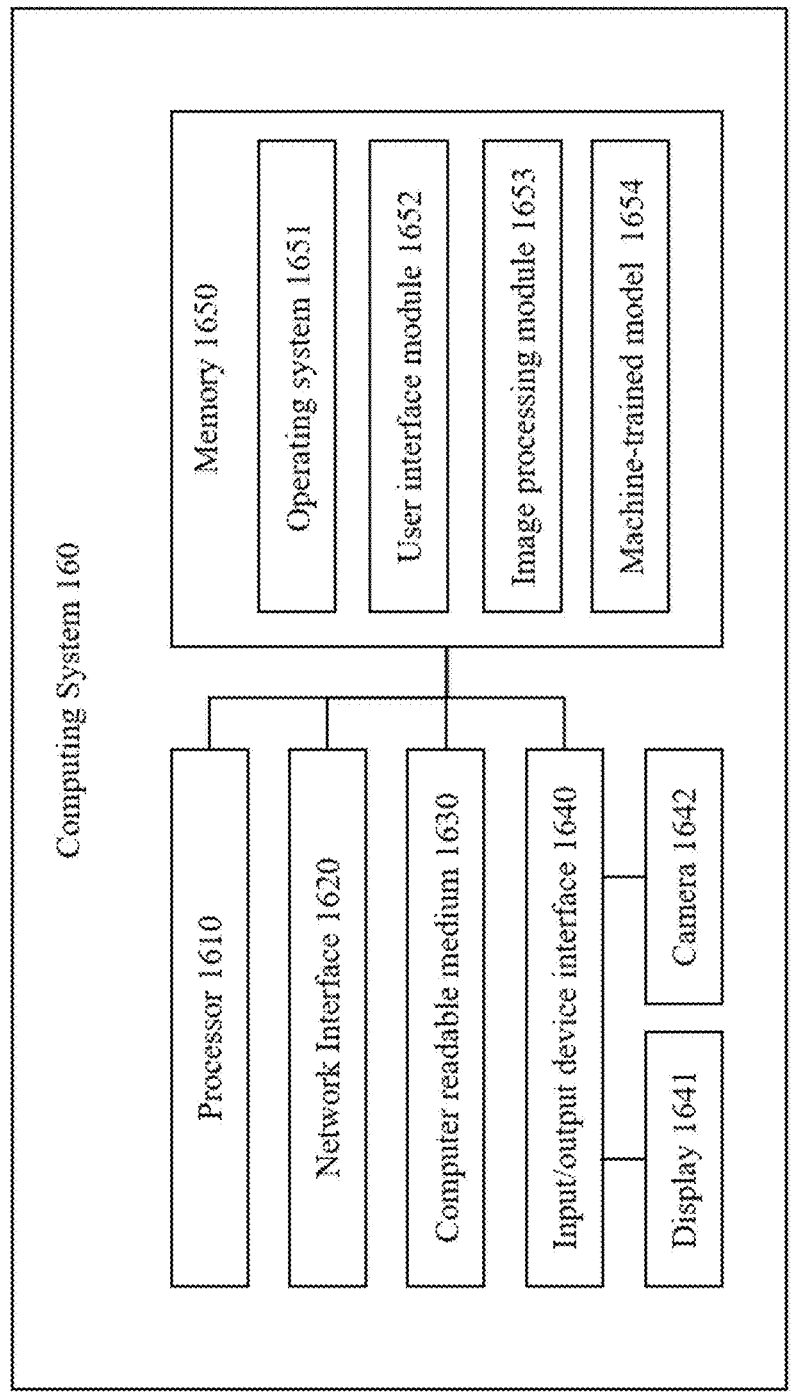
FIG. 19 illustrates one or more computing systems for use with one or more implementations.

FIG. 19 depicts an example architecture of a computing system 160 that can be used to perform one or more of the techniques described herein or illustrated in other drawings. The general architecture of the computing system 160 includes an arrangement of computer hardware and software modules that may be used to implement one or more aspects of the present disclosure. The computing system 160 may include many more (or fewer) elements than those shown in FIG. 19. It is not necessary, however, that all of these elements be shown in order to provide an enabling disclosure.

Hardware

As illustrated, the computing system 160 includes a processor 1610, a network interface 1620, a computer readable medium 1630, and an input/output device interface 1640, all of which may communicate with one another by way of a communication bus. The network interface 1620 may provide connectivity to one or more networks or computing systems. The processor 1610 may also communicate with memory 1650 and further provide output information for one or more output devices, such as a display (e.g., display 1641), speaker, etc., via the input/output device interface 1640. The input/output device interface 1640 may also accept input from one or more input devices, such as a camera 1642 (e.g., 3D depth camera), a keyboard, a mouse, a digital pen, a microphone, a touch screen, a gesture recognition system, a voice recognition system, an accelerometer, a gyroscope, a thermometer, an optical temperature measurement system, a sonar, a LIDAR device, a laser device, etc.

Software—Computer Program Instructions

The memory 1650 may store computer program instructions (grouped as modules in some implementations) that the processor 1610 executes in order to implement one or more aspects of the present disclosure. The memory 1650 may include RAM, ROM, and/or other persistent, auxiliary, or non-transitory computer-readable media. The memory 1650 may store an operating system 1651 that provides computer program instructions for use by the processor 1610 in the general administration and operation of the computing system 160. The memory 1650 may further include computer program instructions and other information for implementing one or more aspects of the present disclosure. In one implementation, for example, the memory 1650 includes a user interface module 1652 that generates user interfaces (and/or instructions therefor) for display, for example, via a browser or application installed on the computing system 160. In addition to and/or in combination with the user interface module 1652, the memory 1650 may include an image processing module 1653, a machine-trained model 1654 that may be executed by the processor 1610. The operations and algorithms of the modules are described in greater detail above with reference to other drawings.

Multiple Components

Although a single processor, a single network interface, a single computer readable medium, a singer input/output device interface, a single memory, a single camera, and a single display are illustrated in the example of FIG. 19, in other implementations, the computing system 160 can have a multiple of one or more of these components (e.g., two or more processors and/or two or more memories).

Other Considerations

Logical blocks, modules or units described in connection with implementations disclosed herein can be implemented or performed by a computing device having at least one processor, at least one memory and at least one communication interface. The elements of a method, process, or algorithm described in connection with implementations disclosed herein can be embodied directly in hardware, in a software module executed by at least one processor, or in a combination of the two. Computer-executable instructions for implementing a method, process, or algorithm described in connection with implementations disclosed herein can be stored in a non-transitory computer readable storage medium.

OTHER CONSIDERATIONS

Although the implementations of the inventions have been disclosed in the context of certain implementations and examples, it will be understood by those skilled in the art that the present inventions extend beyond the specifically disclosed implementations to other alternative implementations and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or sub-combinations of the specific features and aspects of the implementations may be made and still fall within one or more of the inventions. Accordingly, it should be understood that various features and aspects of the disclosed implementations can be combined with or substituted for one another in order to form varying modes of the disclosed inventions. Thus, it is intended that the scope of the present inventions herein disclosed should not be limited by the particular disclosed implementations described above, and that various changes in form and details may be made without departing from the spirit and scope of the present disclosure as set forth in the following claims.

What is claimed is:

1. A method for pizza preparation comprising a sauce step for spreading sauce on a pizza dough and a cheese step for adding cheese over the pizza dough, the method comprising:
capturing, using at least one camera, images of the pizza preparation performed by a person such that the captured images cover the entirety of a 2-dimensional area of the pizza dough;
determining whether each of the sauce and cheese steps is completed based on at least part of the captured images real time while the pizza preparation is being performed; and
upon determining completion of each of the sauce and cheese steps, providing in-situ guidance to the person for the next step or action of the pizza preparation,
wherein during the sauce step the person adds and spreads the sauce on the pizza dough such that a 2-dimensional area of the sauce on the pizza dough changes on the captured images and further such that at least one of the captured images features at least one hand of the person blocking a portion of the sauce spread on the pizza dough;
wherein determining completion of the sauce step comprises a sauce-step processing for processing an image captured during the sauce step to compute the 2-dimensional area of the sauce on the pizza dough and to determine whether the 2-dimensional area of the sauce reaches a predetermined percentage of the 2-dimensional area of the pizza dough, wherein the sauce-step processing is repeated real time for additional captured images excluding the at least one captured image featuring at least one hand blocking a portion of the sauce spread on the pizza dough.

2. The method of claim 1,
wherein completion of the cheese step is determined when the cheese covers more than a predetermined percentage of the pizza dough,
wherein determining completion of the cheese step comprises:
processing an image captured during the cheese step to locate a group of pixels representing the cheese; and
obtaining a 2-dimensional area of the cheese based on the numbers of pixels in the group;
determining that the 2-dimensional area of the cheese is greater than the predetermined percentage of the 2-dimensional area of the pizza dough.

3. The method of claim 1,
wherein completion of the cheese step is determined when the cheese covers more than a predetermined percentage of the pizza dough,
wherein determining completion of the cheese step comprises:
overlaying a grid pattern on the 2-dimensional area of the pizza dough of an image captured during the cheese step;
for each grid unit of the grid pattern, determining if the cheese occupies the grid unit based on a color of the grid unit;
computing of a 2-dimensional area of the cheese based on the number of grid units occupied by the cheese; and
determining that the 2-dimensional area of the cheese is greater than the predetermined percentage of the 2-dimensional area of the pizza dough pizza dough.

4. The method of claim 3, further comprising:
computing for each grid unit a representative color, and comparing the representative color against a predetermined color to determine if the cheese occupies the grid unit.

5. The method of claim 4, wherein the representative color is an average of pixel color values of pixels within each grid unit.

6. The method of claim 5, wherein the cheese has a first color, and the sauce has a second color, wherein determining that the cheese occupies a grid unit is based on either or both of the first and second colors.

7. The method of claim 1,
wherein completion of the cheese step is determined when the cheese covers more than a predetermined percentage of the sauce spread over the pizza dough,
wherein determining completion of the cheese step comprises:
processing an image captured during the cheese step to locate a group of pixels representing the cheese; and
obtaining a 2-dimensional area of the cheese based on the numbers of pixels in the group;
determining that the 2-dimensional area of the cheese is greater than the predetermined percentage of the 2-dimensional area of the sauce spread on the pizza dough in the sauce step.

8. The method of claim 1,
wherein completion of the cheese step is determined when the cheese covers more than a predetermined percentage of the sauce spread over the pizza dough,
wherein determining completion of the cheese step comprises:
overlaying a grid pattern on the 2-dimensional area of the pizza dough of an image captured during the cheese step;
for each grid unit of the grid pattern, determining if the cheese occupies the grid unit based on a color of the grid unit;
computing of a 2-dimensional area of the cheese based on the number of grid units occupied by the cheese; and
determining that the 2-dimensional area of the cheese is greater than the predetermined percentage of the 2-dimensional area of the sauce spread the pizza dough pizza dough in the sauce step.

9. The method of claim 1,
wherein completion of the cheese step is determined when the cheese covers more than a predetermined percentage of the pizza dough or a predetermined percentage of the sauce added on the pizza dough in the sauce step,
wherein during the cheese step the person adds the cheese over the pizza dough such that at least one of the captured images features at least one hand of the person blocking a portion of the cheese added over the pizza dough,
wherein determining completion of the cheese step comprises a cheese-step processing for processing an image captured during the cheese step to compute the 2-dimensional area of the cheese over the pizza dough and to determine whether the 2-dimensional area of the cheese reaches the predetermined percentage of the pizza dough or the predetermined percentage of the sauce, wherein the cheese-step processing is repeated real time for additional captured images excluding the at least one captured image featuring at least one hand blocking a portion of the cheese added over the pizza dough.

10. The method of claim 1, wherein the pizza preparation further comprises a pepperoni step for adding pepperoni slices over the pizza dough,
wherein completion of the pepperoni step is determined when the number of pepperoni slices placed over the pizza dough is greater than a predetermined number,
wherein during the pepperoni step the person adds pepperoni slices over the pizza dough using at least one hand such that at least one of the captured images features at least one hand of the person blocking at least one pepperoni slice placed over the pizza dough,
wherein determining completion of the pepperoni step comprises a pepperoni-step processing for processing an image captured during the pepperoni step to count pepperoni slices featured on the captured image and to determine whether the number of pepperoni slices reaches the predetermined number, wherein the pepperoni-step processing is repeated real time for additional captured images excluding the at least one captured image featuring at least one hand blocking at least one pepperoni slice placed over the pizza dough.

11. The method of claim 1, wherein the pizza preparation further comprises a pepperoni step for adding pepperoni slices over the pizza dough,
wherein completion of the pepperoni step is determined when the number of pepperoni slices placed over the pizza dough is greater than a predetermined number,
wherein determining completion of the pepperoni step comprises identifying each pepperoni slice placed over the pizza dough, determining if each identified pepperoni is larger or smaller than a predetermined size, and counting the identified pepperoni slices each of which is larger than the predetermined size to compute the number of pepperoni slices.

12. The method of claim 1, wherein determining completion of the sauce step comprises:
processing the image captured during the sauce step to identify pixels located within the pizza dough;
obtaining the 2-dimensional area of the pizza dough based on the number of pixels located within the pizza dough;
processing the image captured during the sauce step to identify pixels located within a sauced area where the sauce is applied over the pizza dough; and
obtaining a 2-dimensional size of the sauce based on the number of pixels located within the sauce area.

* * * * *